(12) United States Patent
Morikawa et al.

(10) Patent No.: US 11,169,247 B2
(45) Date of Patent: Nov. 9, 2021

(54) DISTANCE MEASURING APPARATUS, DISTANCE MEASURING METHOD, AND NON-TRANSITORY COMPUTER-READABLE STORAGE MEDIUM FOR STORING DISTANCE MEASURING PROGRAM

(71) Applicant: FUJITSU LIMITED, Kawasaki (JP)

(72) Inventors: Takeshi Morikawa, Yokohama (JP); Koichi Tezuka, Shibuya (JP); Koichi Iida, Kobe (JP)

(73) Assignee: FUJITSU LIMITED, Kawasaki (JP)

( * ) Notice: Subject to any disclaimer, the term of this patent is extended or adjusted under 35 U.S.C. 154(b) by 618 days.

(21) Appl. No.: 16/116,263

(22) Filed: Aug. 29, 2018

(65) Prior Publication Data
US 2019/0072652 A1 Mar. 7, 2019

(30) Foreign Application Priority Data
Sep. 1, 2017 (JP) .............................. JP2017-168349

(51) Int. Cl.
| | | |
|---|---|---|
| *G01S 7/48* | (2006.01) | |
| *G01S 7/487* | (2006.01) | |
| *G01S 17/10* | (2020.01) | |
| *G01S 17/87* | (2020.01) | |
| *G01S 17/42* | (2006.01) | |
| *G01S 7/481* | (2006.01) | |

(52) U.S. Cl.
CPC ............ *G01S 7/4876* (2013.01); *G01S 17/10* (2013.01); *G01S 17/42* (2013.01); *G01S 17/87* (2013.01); *G01S 7/4817* (2013.01)

(58) Field of Classification Search
None
See application file for complete search history.

(56) References Cited

U.S. PATENT DOCUMENTS

2014/0062759 A1 3/2014 Morikawa et al.

FOREIGN PATENT DOCUMENTS

| | | |
|---|---|---|
| JP | 08-329396 | 12/1996 |
| JP | 2014-052274 | 3/2014 |

*Primary Examiner* — Hovhannes Baghdasaryan
(74) *Attorney, Agent, or Firm* — Fujitsu Patent Center

(57) ABSTRACT

A distance measuring apparatus includes: a plurality of two-dimensional scanning laser sensors; and a control circuit configured to control the plurality of two-dimensional scanning laser sensors, wherein each of the two-dimensional scanning laser sensors includes a light projection system configured to project laser light for scanning a measurement target, and a light reception system configured to outputs a signal corresponding to a distance to the measurement target by using a multi-division light receiving element configured to receive return light of the laser light reflected by the measurement target, and the control circuit is configured to synchronize a scanning timing of the laser light projected by a light projection system of each of adjacent two-dimensional scanning laser sensors among the plurality of two-dimensional scanning laser sensors, and cause the adjacent two-dimensional scanning laser sensors to horizontally scan the laser light in a direction opposite from each other.

17 Claims, 19 Drawing Sheets

DISTANCE MEASURING APPARATUS, DISTANCE MEASURING METHOD, AND NON-TRANSITORY COMPUTER-READABLE STORAGE MEDIUM FOR STORING DISTANCE MEASURING PROGRAM

CROSS-REFERENCE TO RELATED APPLICATION

This application is based upon and claims the benefit of priority of the prior Japanese Patent Application No. 2017-168349, filed on Sep. 1, 2017, the entire contents of which are incorporated herein by reference.

FIELD

The embodiments discussed herein are related to a distance measuring apparatus, a distance measuring method, and a non-transitory computer-readable storage medium for storing a distance measuring program.

BACKGROUND

A scanning type distance measuring apparatus that measures a distance to a measurement target by using laser light has been proposed. Such a distance measuring apparatus is also called a laser sensor and includes, for example, a light projecting unit that two-dimensionally scans and irradiates laser light (or laser pulse) from a laser light source emitting light at a fixed timing with, for example, a micro electro mechanical system (MEMS) mirror. In addition, the laser sensor includes a light receiving unit that detects the reflected light from the measurement target with a photodetector in response to the scanning of the laser light by the light projecting unit and calculates the distance to the measurement target for each scanning position.

The laser sensor may also be applied to the detection of various measurement targets including an object such as a living body such as a human being or a vehicle. For example, the laser sensor may output a distance image in which distance values are arranged at each distance measuring point in the order of samples subjected to raster scanning. In this case, the laser sensor may use the distance image to detect a sports player such as a gymnast or a basketball player and measure a form (for example, form of gymnastics performance or basket shoot) or the like of the sports player. The form or movement of a sports player may thus be analyzed based on the distance image measured by the laser sensor. For example, in the case of measuring the form or movement of a gymnast player by a laser sensor, it is also possible to score gymnastics performance based on the analyzed form or movement.

In the case of scoring gymnastics performance, it is desirable to measure the movement of the gymnast player at a high angle of view, high resolution, and high frame rate in order to accurately measure the movement of the gymnast player. However, since there is a limit to an emission interval of the laser pulse, the measurement of a high angle of view, the measurement of high resolution, and the measurement of high frame rate are in a trade-off relationship. Therefore, in the case of measuring by using a single laser sensor, it is difficult to measure the movement of the gymnast player at a high angle of view, high resolution, and high frame rate, for example.

Therefore, a system that measures the same measurement target by using a plurality of laser sensors from a plurality of different directions has been proposed. In a case where the laser sensor has a light projection and reception coaxial structure for one-dimensionally scanning the laser light with a rotating mechanism including a rotating mirror, reflected light from the same direction as the projected laser light is received. Therefore, when the rotation angle of the rotating mirror is within an angular range where erroneous detection of the laser light projected by another laser sensor occurs, it has been proposed to adjust the rotational speed of the rotating mirror. By adjusting the rotational speed of the rotating mirror in this way, it is possible to suppress the laser light projected by another laser sensor from being erroneously detected as the reflected light of the laser light projected by the own laser sensor.

On the other hand, in a case where the laser sensor has a light projection and reception separation structure for two-dimensionally scanning the laser light without using a rotating mechanism including a rotating mirror, the light receiving unit detects all of the projection regions (or scanning range) of the laser light projected by the light projecting unit. Therefore, in a case where the same measurement target is measured from a plurality of different directions, the projection regions of the laser light projected by the plurality of laser sensors interfere with each other. For example, when a first laser sensor and a second laser sensor are arranged so as to be adjacent to each other and projection regions overlap each other, it is difficult to distinguish the return light reflected from the measurement target by the laser light projected by the first laser sensor and the return light reflected from the measurement target by the laser light projected by the second laser sensor. Therefore, for example, in the first laser sensor, the return light reflected from the measurement target by the laser light projected by the second laser sensor is erroneously detected as the return light reflected from the measurement target by the laser light projected by the first laser sensor. In this way, in the case of using a plurality of laser sensors having a light projection and reception separation structure for two-dimensional scanning, it is difficult to suppress erroneous detection as compared with a case where a plurality of laser sensors have a light projection and reception coaxial structure for one-dimensional scanning.

Examples of the related art include Japanese Laid-open Patent Publication No. 8-329396 and Japanese Laid-open Patent Publication No. 2014-52274.

SUMMARY

According to an aspect of the invention, a distance measuring apparatus includes: a plurality of two-dimensional scanning laser sensors; and a control circuit configured to control the plurality of two-dimensional scanning laser sensors, wherein each of the two-dimensional scanning laser sensors includes a light projection system configured to project laser light for scanning a measurement target, and a light reception system configured to outputs a signal corresponding to a distance to the measurement target by using a multi-division light receiving element configured to receive return light of the laser light reflected by the measurement target, and the control circuit is configured to synchronize a scanning timing of the laser light projected by a light projection system of each of adjacent two-dimensional scanning laser sensors among the plurality of two-dimensional scanning laser sensors, and cause the adjacent two-dimensional scanning laser sensors to horizontally scan the laser light in a direction opposite from each other, exclude, from the measurement target in one sensor of the adjacent two-dimensional scanning laser sensors, the laser light projected by the other sensor of the adjacent two-dimensional scanning laser sensors, based on a relationship between a position of a light receiving portion where the multi-division light receiving element of a light reception system of each of the adjacent two-dimensional scanning laser sensors receives the return light and a position of a light receiving portion of the multi-division light receiving element corresponding to a projection direction of the laser light projected by each light projection system, and exclude, from the measurement target in one sensor of the adjacent two-dimensional scanning laser sensors, the laser light projected by the other sensor of the adjacent two-dimensional scanning laser sensors, based on the positions of the adjacent two-dimensional scanning laser sensors, an intersection point of the laser light projected by each light projection system, and a light receiving time measured by each light reception system from the time when each light projection system projects the laser light to the time when the return light from the measurement target is received, in a case where the measurement target is located in an overlapping region where a projection region of the laser light of the one sensor and a projection region of the laser light of the other sensor overlap.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In the related art, in a case where projection regions of a plurality of laser sensors having a light projection and reception separation structure interfere with each other, for example, one laser sensor erroneously detects the return light reflected from the measurement target by the laser light projected by the other laser sensor as the return light reflected from the measurement target by the laser light projected by the one laser sensor. It is difficult to suppress such erroneous detection.

According to one aspect of the present disclosure, there is provided a technique capable of suppressing erroneous detection even in a case where projection regions of a plurality of laser sensors interfere with each other.

In the disclosed distance measuring apparatus, distance measuring method and program, among a plurality of two-dimensional scanning laser sensors having multi-division light receiving elements in a light reception system, an emitting timing and a scanning timing of the laser light projected by each light projection system of adjacent two-dimensional scanning laser sensors are synchronized to horizontally scan the laser light in a reverse direction between the adjacent two-dimensional scanning laser sensors. In addition, based on the relationship between the position of a light receiving portion where each light reception system of the adjacent two-dimensional scanning laser sensors receives the return light and the position of a light receiving portion corresponding to the projection direction of the laser light projected by each light projection system, the laser light projected by the other sensor in one of the two adjacent two-dimensional scanning laser sensors is excluded from the measurement target. In a case where the measurement target is located in the overlapping region where the projection regions of the laser light of the adjacent two-dimensional scanning laser sensors overlap, based on the positions of the adjacent two-dimensional scanning laser sensors, the intersection point of the laser light projected by each light projection system, and the light receiving time measured by each light reception system from the time when each light projection system projects the laser light to the time when the return light from the measurement target is received, in the one sensor, the laser light projected by the other sensor is excluded from the measurement target.

Examples of the disclosed distance measuring apparatus, distance measuring method, and a program will be described below with reference to drawings.

Example

Figure 1:
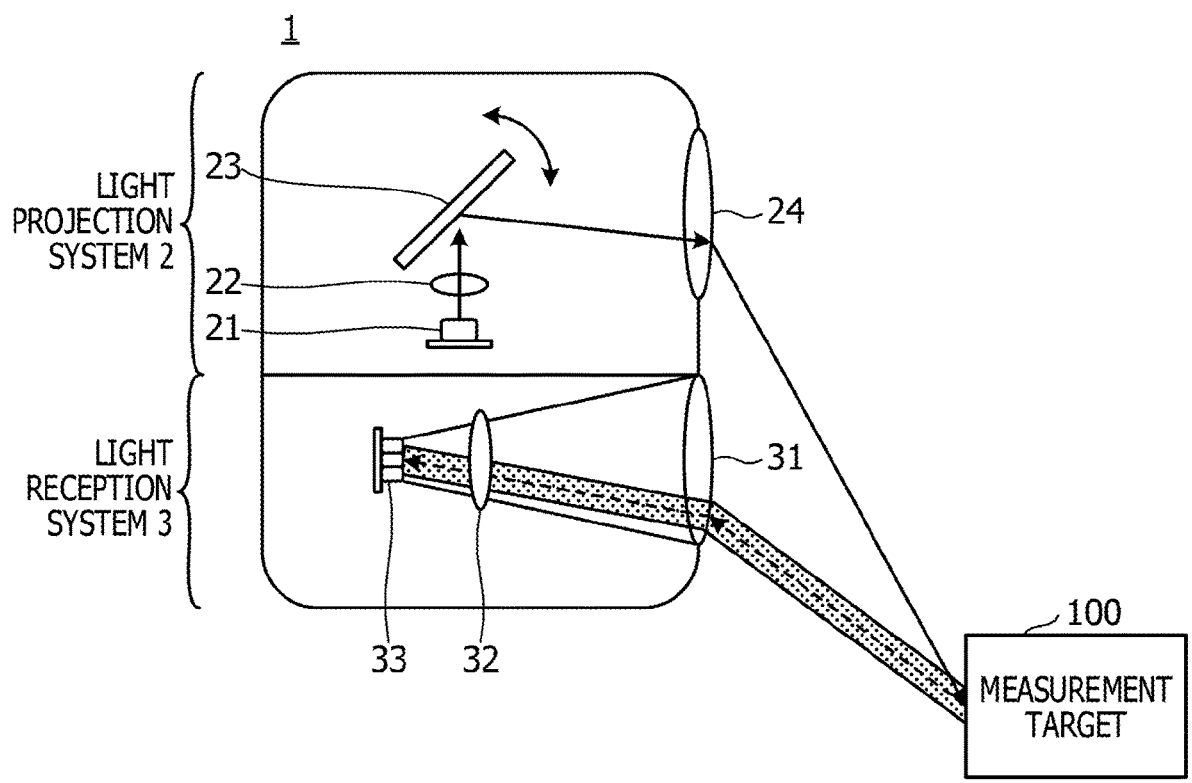
FIG. 1 is a schematic diagram illustrating an example of a sensor in one example.

FIG. 1 is a schematic diagram illustrating an example of a sensor in one embodiment. A sensor 1 illustrated in FIG. 1 is an example of a two-dimensional scanning laser sensor and includes a light projection system (or light projecting unit) 2 and a light reception system (or light receiving unit)

3. For convenience of description, illustration of a control system (or control unit) of the sensor 1 is omitted in FIG. 1. A light projection system 2 includes a laser diode 21 which is an example of a light source, a collimator lens 22, a scanning mirror 23 which is driven biaxially with a well-known method, and a light projecting lens 24. The laser light (or laser pulse) emitted by the laser diode 21 is reflected by the scanning mirror 23 driven biaxially by a well-known method via the collimator lens 22 and scans a measurement target 100 which is a target of measurement via the light projecting lens 24 in two dimensions (hereinafter, also referred to as "two-dimensional scanning").

The light reception system 3 includes a light receiving lens 31, a condensing lens 32, and a multi-division light receiving element 33 which is an example of a photodetector. The return light of the laser light reflected by the measurement target 100 is received by the multi-division light receiving element 33 via the light receiving lens 31 and the condensing lens 32.

Figure 2:
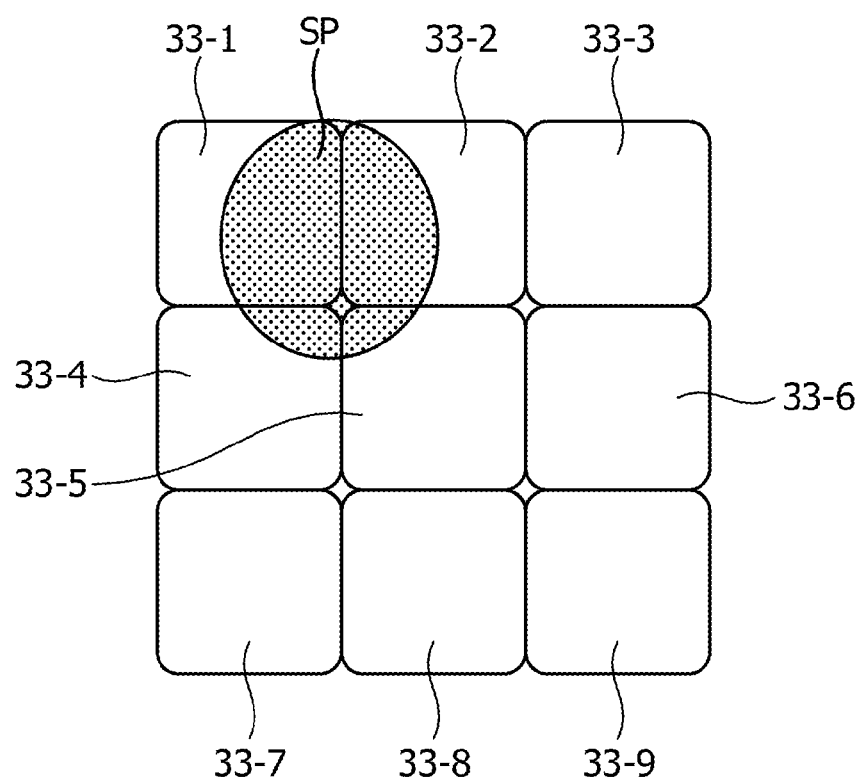
FIG. 2 is a front diagram schematically illustrating an example of a multi-division light receiving element.

FIG. 2 is a front diagram schematically illustrating an example of the multi-division light receiving element. Since the multi-division light receiving element 33 illustrated in FIG. 2 is divided into nine in this example, the multi-division light receiving element 33 has nine light receiving portions arranged in matrix (or light receiving areas) 33-1 to 33-9. The condensing lens 32 forms a beam spot SP having a specific size on the light receiving portions 33-1 to 33-9 of the multi-division light receiving element 33 by the return light of the laser light reflected by the measurement target 100. In this example, each of the light receiving portions 33-1 to 33-9 is substantially rectangular having the same size, and the beam spot SP indicated by a satin pattern is substantially circular (elliptical in this example). In addition, the size (that is, the area) of the beam spot SP is larger than the size (that is, the area) of each of the light receiving portions 33-1 to 33-9. The size of the beam spot SP may be determined according to the design of the light receiving lens 31 and the condensing lens 32. The division number of the multi-division light receiving element 33 is not limited to nine divisions.

The light projection system 2 of the sensor 1 horizontally scans the laser light in the scanning direction as described later to scan a predetermined projection region (or scanning range). For this reason, the return light of the laser light projected by the light projection system 2 of the sensor 1 and reflected by the measurement target 100 is received by light receiving portions in a specific region of the multi-division light receiving element 33 of the light reception system 3 of the sensor 1. That is, the laser light projected by the light projection system 2 is received by the light receiving portions at the positions corresponding to the projection direction of the laser light among the light receiving portions of the multi-division light receiving element 33. In other words, in the sensor 1, it is possible to estimate in advance the light receiving portions of the multi-division light receiving element 33 that receives the laser light from the other sensor or the return light reflected from the measurement target 100 by the laser light projected by the other sensor. When measuring the measurement target 100, it is possible to receive the return light of the laser light projected by the sensor 1 and reflected by the measurement target 100 by the light receiving portions in the specific region securing the directivity among the light receiving portions of the multi-division light receiving element 33 excluding the light receiving portions estimated to receive the laser light from the other sensor.

In this way, the sensor 1 may receive the return light of the laser light reflected by the measurement target 100 by the light receiving portions in the specific region securing the directivity to measure the distance to the measurement target 100 from light receiving signals output from the light receiving portions. In other words, it is possible to determine that the laser light received by the light receiving portions in the regions other than the specific region securing the directivity is not the return light of the laser light reflected from the measurement target 100 by the laser light projected by the sensor 1, but is the laser light projected by the other sensor (including the return light reflected from the measurement target 100 by the laser light projected by the other sensor). Therefore, based on the relationship between the position of the light receiving portion where the multi-division light receiving element 33 of each light reception system 3 of the adjacent sensors receives the return light and the position of the light receiving portion of the multi-division light receiving element 33 corresponding to the projection direction of the laser light projected by each light projection system 2, it is possible to exclude the laser light projected by the other sensor in one of the adjacent sensors from the measurement target.

Figure 3:
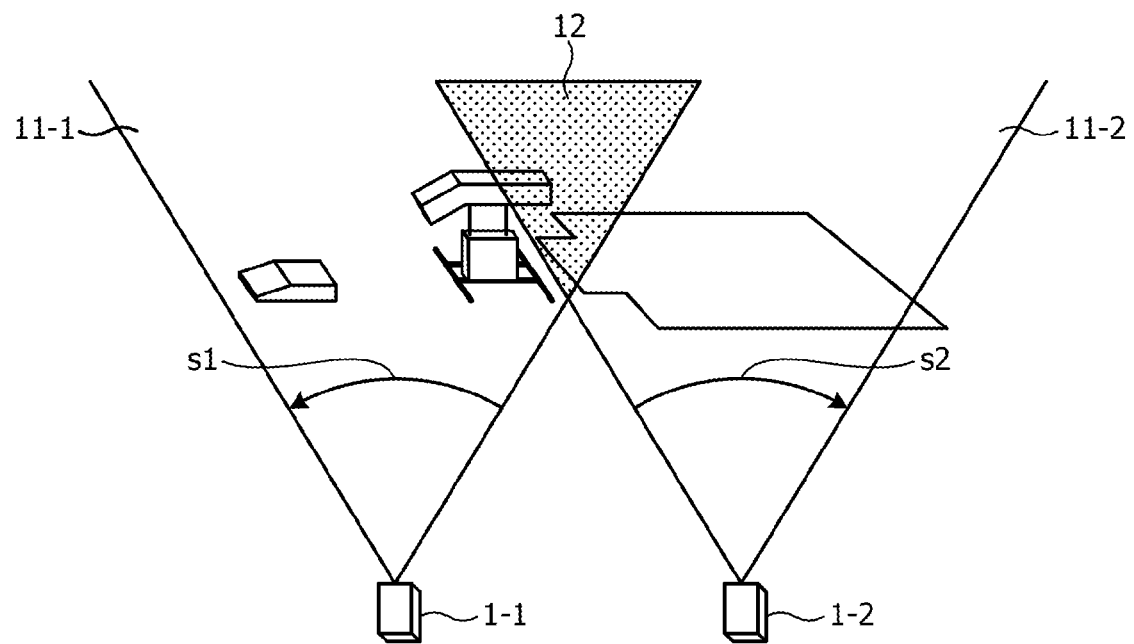
FIG. 3 is a schematic diagram illustrating an example of a scanning direction of adjacent sensors.

However, as illustrated in FIG. 3 to be described later, in the case of providing an overlapping region where the projection region of the sensor 1 and the projection region of the other adjacent sensor overlap, it is difficult to distinguish whether the laser light reflected and received from the measurement target 100 in the overlapping region is the return light reflected from the measurement target 100 by the laser light projected by the sensor 1, or the return light reflected from the measurement target 100 projected from the other sensor. Therefore, with respect to the laser light received from the overlapping region, the return light reflected from the measurement target 100 by the laser light projected by the sensor 1 and the return light which is to be excluded from the measurement target and reflected from the measurement target 100 by the laser light projected by the other sensor are distinguished with the method described in FIG. 4 and the following.

FIG. 3 is a schematic diagram illustrating an example of a scanning direction of the adjacent sensors. In FIG. 3, the adjacent sensors 1-1 and 1-2 have the same configuration as the sensor 1 illustrated in FIG. 1. The sensor 1-1 horizontally scans the laser light in a scanning direction s1 indicated by an arrow and scans a projection region (or scanning range) 11-1. On the other hand, the sensor 1-2 horizontally scans the laser light in a scanning direction s2 indicated by an arrow and scans a projection region (or scanning range) 11-2. The scanning direction s1 of the laser light by the sensor 1-1 and the scanning direction s2 of the laser light by the sensor 1-2 are opposite to each other. In the distance measuring apparatus having a plurality of sensors, in order to remove undetected regions in an appropriate measurement distance range, an overlapping region where the sensors interfere with each other is provided. Therefore, the projection region 11-1 of the sensor 1-1 and the projection region 11-2 of the sensor 1-2 overlap each other in an overlapping region 12 indicated by a satin pattern.

Since the laser light projected by the sensors 1-1 and 1-2 two-dimensionally scans the measurement target 100, in FIG. 3, horizontal scanning (or main scanning) is performed in a direction parallel to the paper surface, and vertical scanning (or sub-scanning) is performed in a direction perpendicular to the paper surface. In this way, the laser light projected by each of the sensors 1-1 and 1-2 scans the projection region at a regular angle in the horizontal direction and also scans the projection region at a regular angle in the vertical direction.

In this example, since the distance measuring apparatus measures the form or movement of a gymnast player (not illustrated) which is an example of the measurement target 100, a takeoff board, a vaulting horse, a mat, and the like are illustrated in FIG. 3, but the environment using the distance measuring apparatus is not limited to the environment of measuring the form or movement of the gymnast player.

The arrangement of the adjacent sensors 1-1 and 1-2 is set such that a desired projection region suitable for measuring the measurement target 100 may be horizontally scanned, and in this example, the adjacent sensors 1-1 and 1-2 are separated by a fixed interval. For convenience of description, the distance from the center of one sensor 1-1 along the perpendicular direction of a first virtual line to a second virtual line which is parallel to the first virtual line passing through the centers of the adjacent sensors 1-1 and 1-2 and passing through the center of the measurement target 100 and the distance along the perpendicular direction of the first virtual line from the center of the other sensor 1-2 are equal, but may be different distances from each other.

Figure 4:
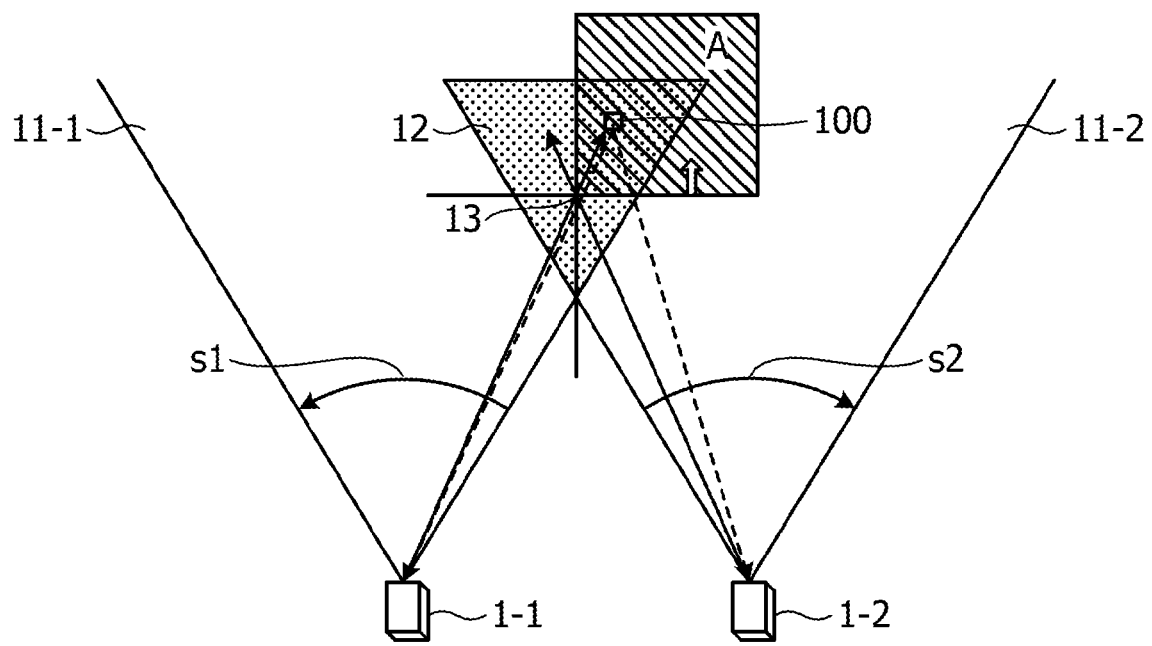
FIG. 4 is a schematic diagram for describing the measurement of an example of a measurement target far from an intersection point of laser light.
Figure 5:
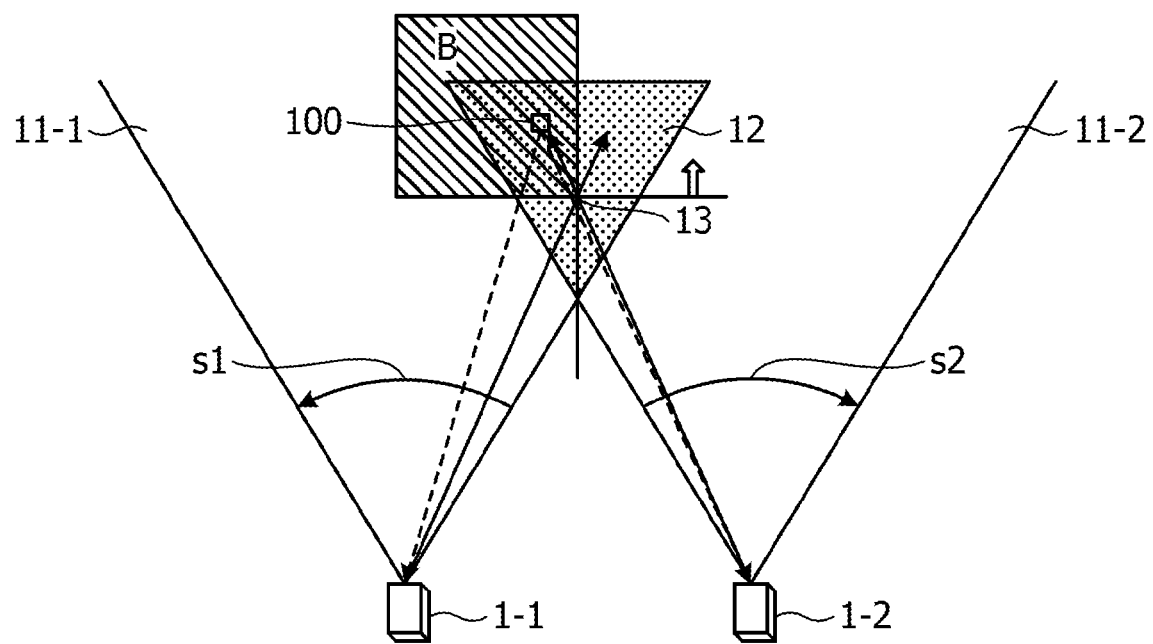
FIG. 5 is a schematic diagram for describing the measurement of another example of the measurement target far from the intersection point of laser light.

FIG. 4 is a schematic diagram for describing the measurement of an example of the measurement target far from the intersection point of the laser light, and FIG. 5 is a schematic diagram for describing the measurement of another example of the measurement target far from the intersection point of the laser light. In FIGS. 4 and 5, the same parts as those in FIG. 3 are denoted by the same reference numerals, and description thereof is omitted. In this example, in FIGS. 4 and 5, by synchronizing the sensors 1-1 and 1-2 so that the emitting timing and the scanning timing of the laser light projected by each of the laser diodes 21 are synchronized, the laser light is controlled to be horizontally scanned in each of the scanning directions s1 and s2 that are opposite to each other to limit the overlapping region (or erroneously detected region) 12 where the laser light projection regions 11-1 and 11-2 overlap to a specific area.

As illustrated in FIG. 4, in the overlapping region 12, in a case where the distance from the sensor 1-1 is farther than the distance to an intersection point 13 of the laser light projected by the sensors 1-1 and 1-2 and the measurement target 100 is located in the overlapping region 12 in the hatched portion A, the laser light indicated by the thick solid line projected by the sensor 1-1 strikes the measurement target 100. The return light of the laser light indicated by the broken line reflected by the measurement target 100 is detected by the respective sensors 1-1 and 1-2. A light receiving time Ta from the time when the sensor 1-1 projects the laser light to the time when the sensor 1-1 detects the return light of the reflected laser light and a light receiving time Tb from the time when the sensor 1-1 projects the laser light to the time when the adjacent sensor 1-2 erroneously detects the return light of the reflected laser light satisfy the relationship of Ta>Tb.

Similarly, as illustrated in FIG. 5, in the overlapping region 12, in a case where the distance from the sensor 1-2 is farther than the distance to the intersection point 13 of the laser light and the measurement target 100 is located in the overlapping region 12 in a hatched portion B, the laser light indicated by the thick solid line projected by the sensor 1-2 strikes the measurement target 100. The return light of the laser light indicated by the broken line reflected by the measurement target 100 is detected by the respective sensors 1-2 and 1-1. The light receiving time Tb from the time when the sensor 1-2 projects the laser light to the time when the sensor 1-2 detects the return light of the reflected laser light and the light receiving time Ta from the time when the sensor 1-2 projects the laser light to the time when the adjacent sensor 1-1 erroneously detects the return light of the reflected laser light satisfy the relationship of Ta<Tb.

In this manner, in the case of the measurement target 100 that is farther from the intersection point 13 of the laser light projected by the sensors 1-1 and 1-2, the sensor having a shorter light receiving time erroneously detects.

Figure 6:
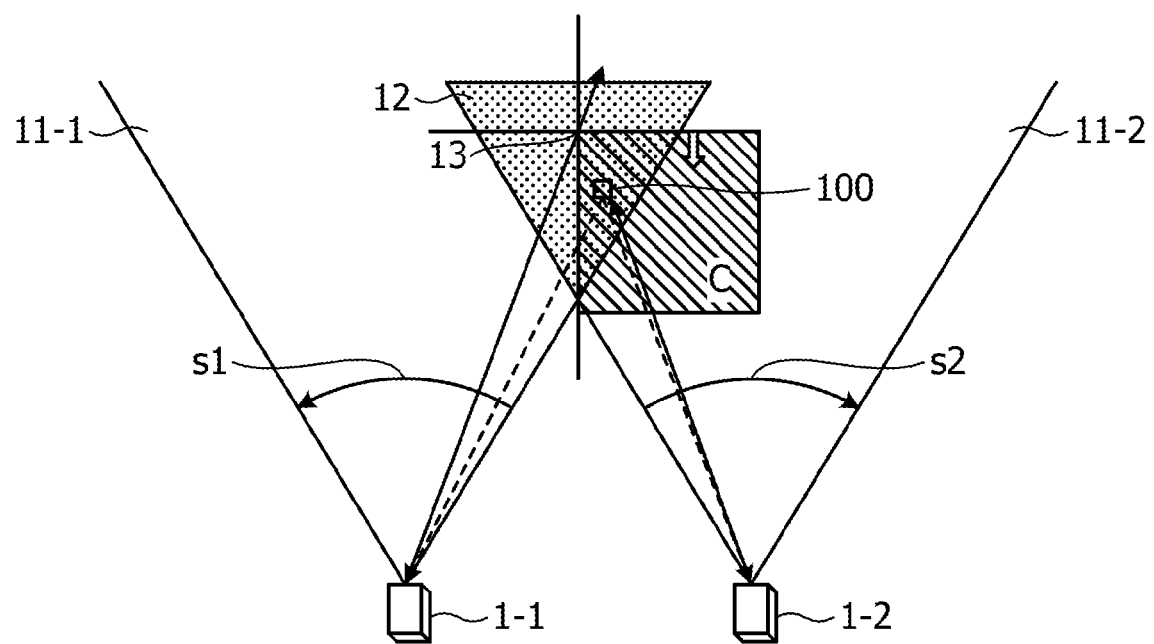
FIG. 6 is a schematic diagram for describing the measurement of an example of a measurement target closer than the intersection point of laser light.
Figure 7:
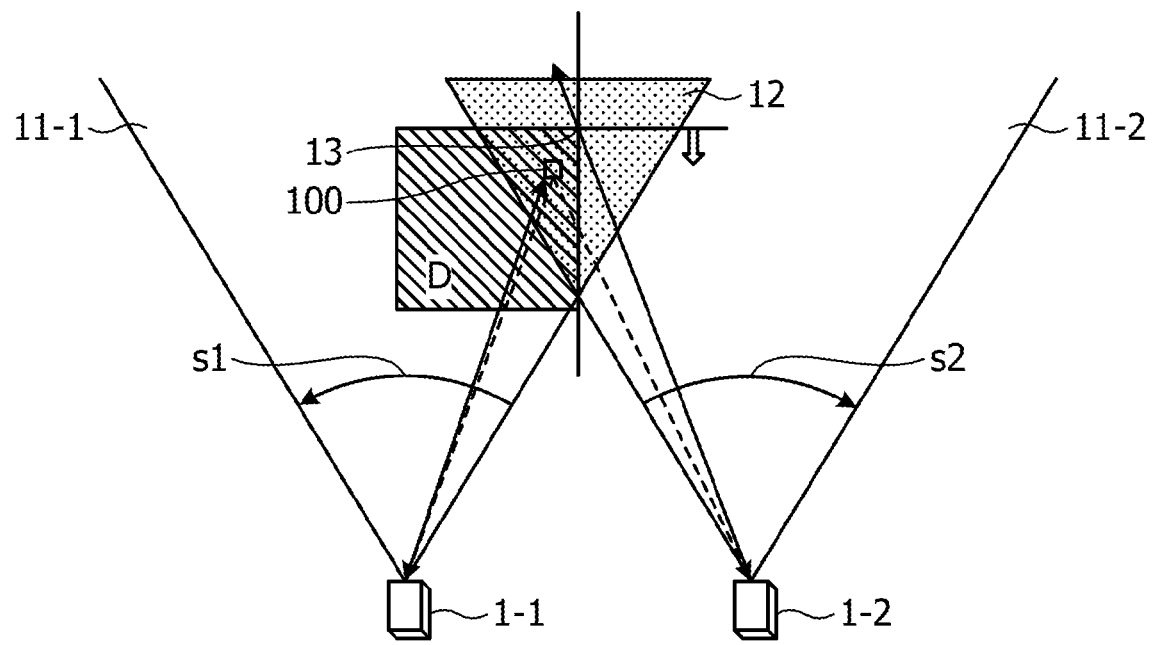
FIG. 7 is a schematic diagram for describing the measurement of another example of the measurement target closer than the intersection point of laser light.

FIG. 6 is a schematic diagram for describing the measurement of an example of the measurement target closer than the intersection point of the laser light, and FIG. 7 is a schematic diagram for describing the measurement of another example of the measurement target closer than the intersection point of the laser light. In FIGS. 6 and 7, the same parts as those in FIG. 3 are denoted by the same reference numerals, and description thereof is omitted.

As illustrated in FIG. 6, in the overlapping region 12, in a case where the distance from the sensor 1-1 is closer than the distance to the intersection point 13 of the laser light projected by the sensors 1-1 and 1-2 and the measurement target 100 is located in the overlapping region 12 in a hatched portion C, the laser light indicated by the thick solid line projected by the sensor 1-2 strikes the measurement target 100. The return light of the laser light indicated by the broken line reflected by the measurement target 100 is detected by the respective sensors 1-2 and 1-1. The light receiving time Tb from the time when the sensor 1-2 projects the laser light to the time when the sensor 1-2 detects the return light of the reflected laser light and the light receiving time Ta from the time when the sensor 1-2 projects the laser light to the time when the adjacent sensor 1-1 erroneously detects the return light of the reflected laser light satisfy the relationship of Ta>Tb.

Similarly, as illustrated in FIG. 7, in the overlapping region 12, in a case where the distance from the sensor 1-2 is closer than the distance to the intersection point 13 of the laser light and the measurement target 100 is located in the overlapping region 12 in a hatched portion D, the laser light indicated by the thick solid line projected by the sensor 1-1 strikes the measurement target 100. The return light of the laser light indicated by the broken line reflected by the measurement target 100 is detected by the respective sensors 1-1 and 1-2. The light receiving time Ta from the time when the sensor 1-1 projects the laser light to the time when the sensor 1-2 detects the return light of the reflected laser light and the light receiving time Tb from the time when the sensor 1-1 projects the laser light to the time when the adjacent sensor 1-1 erroneously detects the return light of the reflected laser light satisfy the relationship of Ta<Tb.

In this manner, in the case of the measurement target 100 that is closer than the intersection point 13 of the laser light projected by the sensors 1-1 and 1-2, the sensor having a longer light receiving time erroneously detects.

Therefore, it is possible to determine whether or not the detection is erroneous detection of the laser light projected by the other sensor 1-2 (or sensor 1-1) in one adjacent sensor 1-1 (or sensor 1-2) based on the positions of the adjacent sensors 1-1 and 1-2, the intersection point 13 of the laser light to be projected, and the light receiving time until the sensors 1-1 and 1-2 receive the return light from the measurement target 100.

Figure 8A:
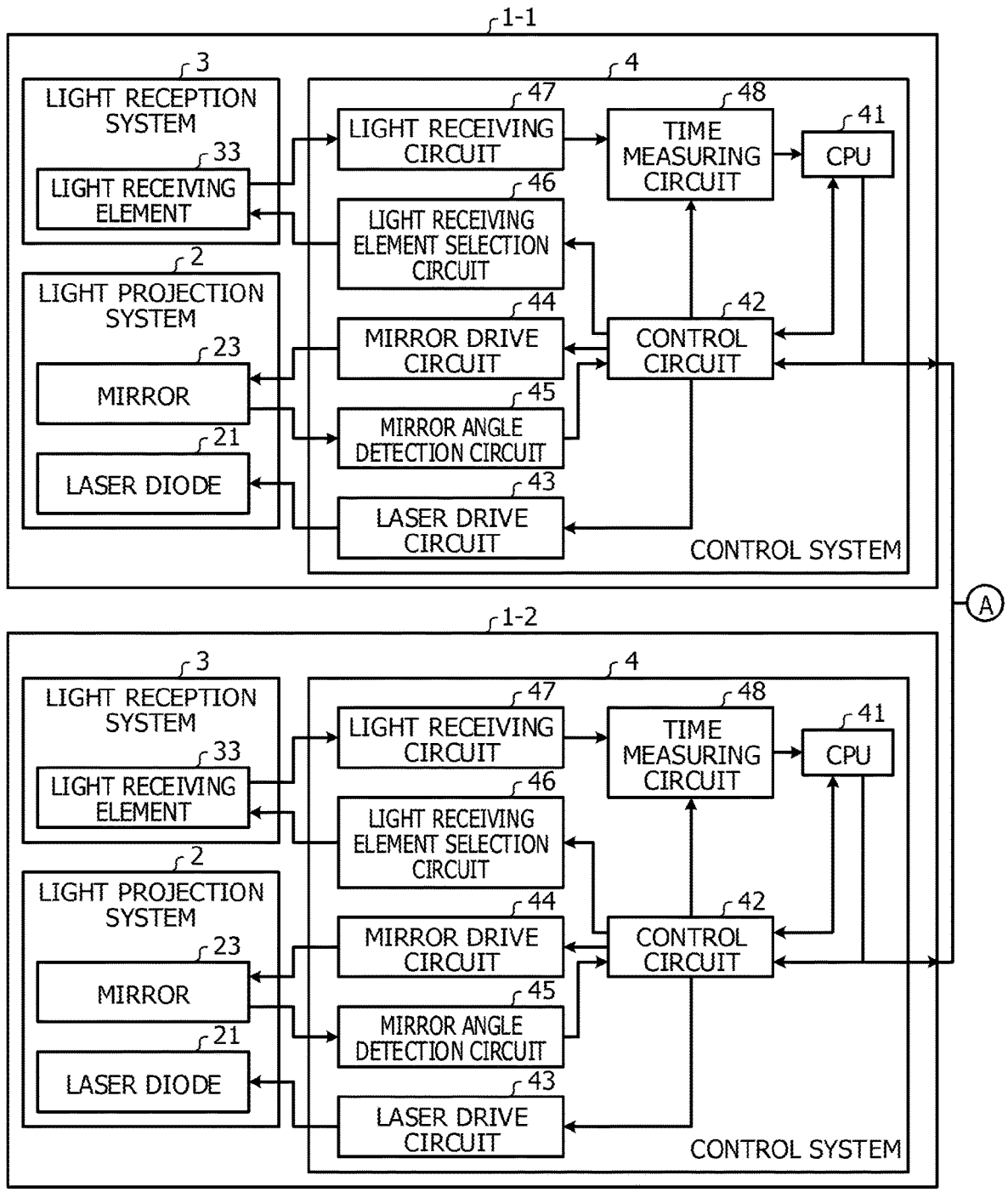
FIGS. 8A and 8B are a block diagram illustrating an example of a configuration of a distance measuring apparatus in a first example.
Figure 8B:
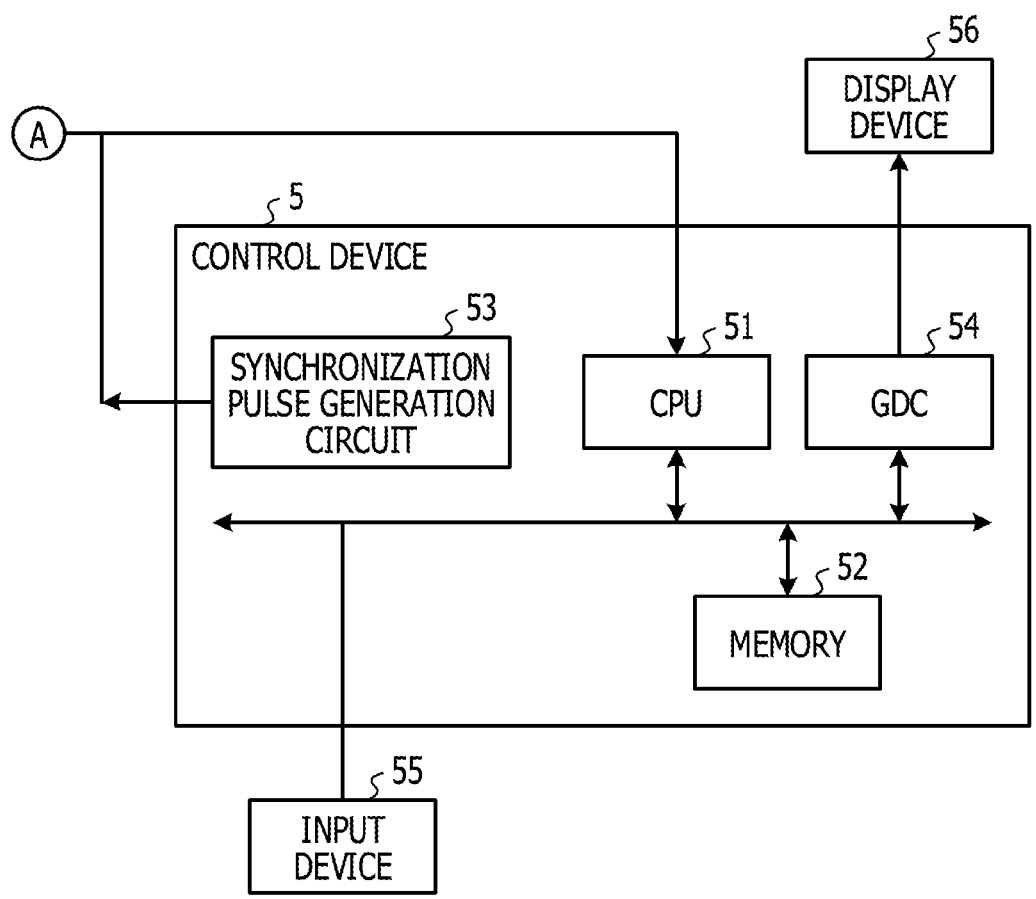

FIG. 8 (i.e. FIGS. 8A and 8B) is a block diagram illustrating an example of a configuration of a distance measuring apparatus in a first example. A distance measuring apparatus 40-1 illustrated in FIG. 8 includes sensors 1-1 and 1-2 and a control device 5. Each of the sensors 1-1 and 1-2 has the same configuration including the light projection system 2, the light reception system 3, and a control system 4. For convenience of description, in FIG. 8, illustration of the parts other than the laser diode 21 and the scanning mirror 23 of the light projection system 2 is omitted and illustration of the parts other than the multi-division light receiving element 33 of the light reception system 3 is omitted, but the light projection system 2 and the light reception system 3 have the same configuration as that of FIG. 1, for example. The scanning mirror 23 of the light projection system 2 may be formed by, for example, a two-dimensional micro electro mechanical system (MEMS) mirror.

The control system 4 may be formed by, for example, a microcontroller including an electronic control unit (ECU) for sensor control. In this example, the control system 4 includes a central processing unit (CPU) 41, a control circuit 42, a laser drive circuit 43, a mirror drive circuit 44, a mirror angle detection circuit 45, a light receiving element selection circuit 46, a light receiving circuit 47, and a time measuring circuit 48. For convenience of description, a memory for storing programs executed by the CPU 41 and various data is not illustrated in FIG. 8, but the memory may be included in the control circuit 42, for example.

The control device 5 may be formed by, for example, a microcontroller including an ECU for synchronous control. The control device 5 is an example of a control unit that controls the sensors 1-1 and 1-2. Specifically, the control device 5 is an example of a control unit that performs control so that the emitting timing and the scanning timing of the laser light projected by each of the light projection systems 2 of the adjacent sensors 1-1 and 1-2 are synchronized and the laser light is horizontally scanned in the reverse direction and excludes the laser light projected by the other sensor in one of the adjacent sensors 1-1 and 1-2 from the measurement target based on the relationship between the position of the light receiving portion where the multi-division light receiving element 33 of each light reception system 3 of the adjacent sensors 1-1 and 1-2 receives the return light and the position of the light receiving portion of the multi-division light receiving element 33 corresponding to the projection direction of the laser light projected by each light projection system 2. In a case where the measurement target 100 is located in the overlapping region 12 where the projection regions 11-1 and 11-2 of the laser light of the adjacent sensors 1-1 and 1-2 overlap, the control device 5 excludes the laser light projected by the other sensor in one sensor from the measurement target based on the positions of the adjacent sensors 1-1 and 1-2, the intersection point 13 of the laser light projected by each light projection system 2, and the light receiving time measured by each light reception system 3 each from the time when each light projection system 2 projects the laser light to the time when the return light from the measurement target 100 is received. In this example, the control device 5 includes a CPU 51, a memory 52 for storing programs to be executed by the CPU 51 and various data, a synchronization pulse generation circuit 53, and a graphic display controller (GDC) 54. The control device 5 may be connected with an input device 55 such as a keyboard for a user to input commands, data and the like, and a display device 56 that displays a message and the like to the user via the GDC 54 as a result of distance measurement processing. The result of the distance measurement processing may be a distance image in which distance values are arranged at each distance measurement point in order of samples subjected to raster scanning, for example.

The control device 5 is also an example of a control unit that controls the laser light to be horizontally scanned in the scanning directions s1 and s2 that are opposite to each other, for example, as illustrated in FIGS. 4 to 7 and limits the overlapping region 12 where the laser light projection regions 11-1 and 11-2 overlap to a specific area by synchronizing the sensors 1-1 and 1-2 so that the emitting timing and the scanning timing of the laser light emitted by the laser diode 21 are synchronized.

The program stored in the memory 52 includes a distance measurement program. The CPU 51 projects laser light for scanning the measurement target 100 from the light projection system 2 by executing the distance measurement program and executes distance measurement processing of measuring the distance to the measurement target 100 based on the outputs of the sensors 1-1 and 1-2 that receive the return light of the laser light reflected from the measurement target 100 by the light reception system 3 including the multi-division light receiving element 33 and outputs a signal corresponding to the distance to the measurement target 100. In response to the signal from the CPU 51 which has started the distance measurement processing, the synchronization pulse generation circuit 53 of the control device 5 synchronizes the sensors 1-1 and 1-2 so that the emitting timing and the scanning timing of the laser light projected by the laser diode 21 are synchronized to generate a synchronization pulse for controlling the laser light to be horizontally scanned in the scanning directions s1 and s2 that are opposite to each other and supply the synchronization pulse to the sensors 1-1 and 1-2. The synchronization pulse is supplied to the CPU 41 and the control circuit 42 of each of the sensors 1-1 and 1-2.

In each of the sensors 1-1 and 1-2, the CPU 41 controls all the sensors to which the CPU 41 belongs based on the synchronization pulse. In addition, in each of the sensors 1-1 and 1-2, under the control of the CPU 41, the control circuit 42 controls the operation timing of the laser drive circuit 43, the mirror drive circuit 44, the light receiving element selection circuit 46, and the time measuring circuit 48 based on the synchronization pulse. In this way, in each of the sensors 1-1 and 1-2, the emitting timing at which the laser diode 21 of the light projection system 2 is driven by the laser drive circuit 43 to emit light and the timing at which the scanning mirror 23 of the light projection system 2 is driven biaxially by the mirror drive circuit 44 with a well-known manner to horizontally scan the laser light in the scanning directions s1 and s2 that are opposite to each other are synchronized. The mirror angle of the scanning mirror 23 is detected by the mirror angle detection circuit 45 with a well-known method, and an angle signal indicating the mirror angle is supplied to the control circuit 42. In this way, the laser light emitted from the laser diode 21 is deflected by the scanning mirror 23 via the collimator lens 22 illustrated in FIG. 1 and scans the projection regions 11-1 and 11-2 via the light projecting lens 24 illustrated in FIG. 1, for example, performs raster scanning. By performing raster scanning in the horizontal scanning direction and the vertical scanning direction, laser light may be scanned frame by frame. The light projecting lens 24 may include an enlarging lens that enlarges the projection region (that is, the angle of the scanning range).

In this example, the sensors 1-1 and 1-2 are synchronized so that the horizontal scanning direction and the vertical scanning direction of the laser light coincide between the sensors 1-1 and 1-2. For example, in FIGS. 4 to 7, the horizontal scanning direction of laser light is a direction parallel to the paper surface of each drawing, and the vertical scanning direction of laser light is a direction perpendicular to the paper surface of each drawing. In addition, the pulse intervals of the laser light of the sensors 1-1 and 1-2 are set to be the same. Further, the phases in the vertical scanning direction of the laser light of the sensors 1-1 and 1-2 may be adjusted based on the synchronization pulses input from the control device 5 to each of the sensors 1-1 and 1-2.

In each of the sensors 1-1 and 1-2, the multi-division light receiving element 33 of the light reception system 3 receives laser light via the light receiving lens 31 and the condensing lens 32 illustrated in FIG. 1. The light receiving element selection circuit 46 selects the light receiving signals output from the light receiving portions limited to the specific region ensuring the directivity among the light receiving portions (or light receiving areas) of the multi-division light receiving element 33 and supplies the light receiving signals to the light receiving circuit 47. When the multi-division light receiving element 33 is divided into nine divisions as illustrated in FIG. 2, for example, among the light receiving signals representing the laser light detected by the nine light receiving portions (or light receiving areas) 33-1 to 33-9, the light receiving signals output from the light receiving portions selected by the light receiving element selection circuit 46 are output from the multi-division light receiving element 33. The specific region securing the directivity may be set in the control circuit 42 or the light receiving element selection circuit 46 in advance when sensors 1-1 and 1-2 are installed. Even if the specific region securing the directivity is set directly to the sensors 1-1 and 1-2, for example, depending on the setting from the input device 55, the specific region may be set from the control device 5 to the sensors 1-1 and 1-2.

Projection regions 11-1 and 11-2 of the sensors 1-1 and 1-2 are predetermined. Therefore, among the light receiving portions 33-1 to 33-9 of the multi-division light receiving element 33 of the sensor 1-1, it is possible to specify the light receiving portions that receive the return light reflected from the measurement target 100 by the laser light projected by the sensor 1-1 in the projection region 11-1. Similarly, among the light receiving portions 33-1 to 33-9 of the multi-division light receiving element 33 of the sensor 1-2, it is possible to specify the light receiving portions that receive the return light reflected from the measurement target 100 by the laser light projected by the sensor 1-2 in the projection region 11-2. In each of the sensors 1-1 and 1-2, among the multi-division light receiving elements 33, due to the light receiving portions within the specific region specified in this manner securing the directivity, it is possible to receive the return light of the laser light projected by the sensors 1-1 and 1-2 and reflected by the measurement target 100. In each of the sensors 1-1 and 1-2, since the light receiving portions in the specific region securing the directivity receives the return light of the laser light reflected by the measurement target 100 and outputs the light receiving signals, it is possible to measure the distance to the measurement target 100 from the light receiving signals. In other words, it is determined that the laser light received by the light receiving portions other than the specific region securing the directivity is not the return light of the laser light reflected from the measurement target 100 by the laser light projected by each of the sensors 1-1 and 1-2, but is the laser light projected by the other sensor (including the return light reflected from the measurement target 100 by the laser light projected by the other sensor).

In the example illustrated in FIG. 8, the light receiving signals output from the light receiving portions selected by the light receiving element selection circuit 46 are output from the multi-division light receiving element 33 and are supplied to the light receiving circuit 47. However, the light receiving signals output from the selected light receiving portions may be selected by the light receiving element selection circuit 46 in the light receiving circuit 47.

In each of the sensors 1-1 and 1-2, the time measuring circuit 48 measures a light receiving time $\Delta T$ represented by the round-trip time (TOF: Time Of Flight) from the time when the laser light is projected from the light projection system 2 under the control of the control circuit 42 to the time when the laser light is reflected from the measurement target 100 and returns to the light reception system 3 and supplies light receiving time $\Delta T$ to the CPU 41. Based on the measured light receiving time $\Delta T$, the CPU 41 measures the distance to the measurement target 100 and supplies the distance data indicating the measured distance to the CPU 51 of the control device 5. Here, when the light velocity is represented by c (about 300,000 km/s), the distance to the measurement target 100 may be calculated from $(c \times \Delta T)/2$, for example. Each of the sensors 1-1 and 1-2 may output a signal corresponding to the distance to the measurement target 100. Therefore, in a case where the distance data is obtained by the CPU 51 of the control device 5, the CPU 41 of each of the sensors 1-1 and 1-2 may supply the light receiving time $\Delta T$ measured by the time measuring circuit 48 to the CPU 51 of the control device 5.

Figure 9:
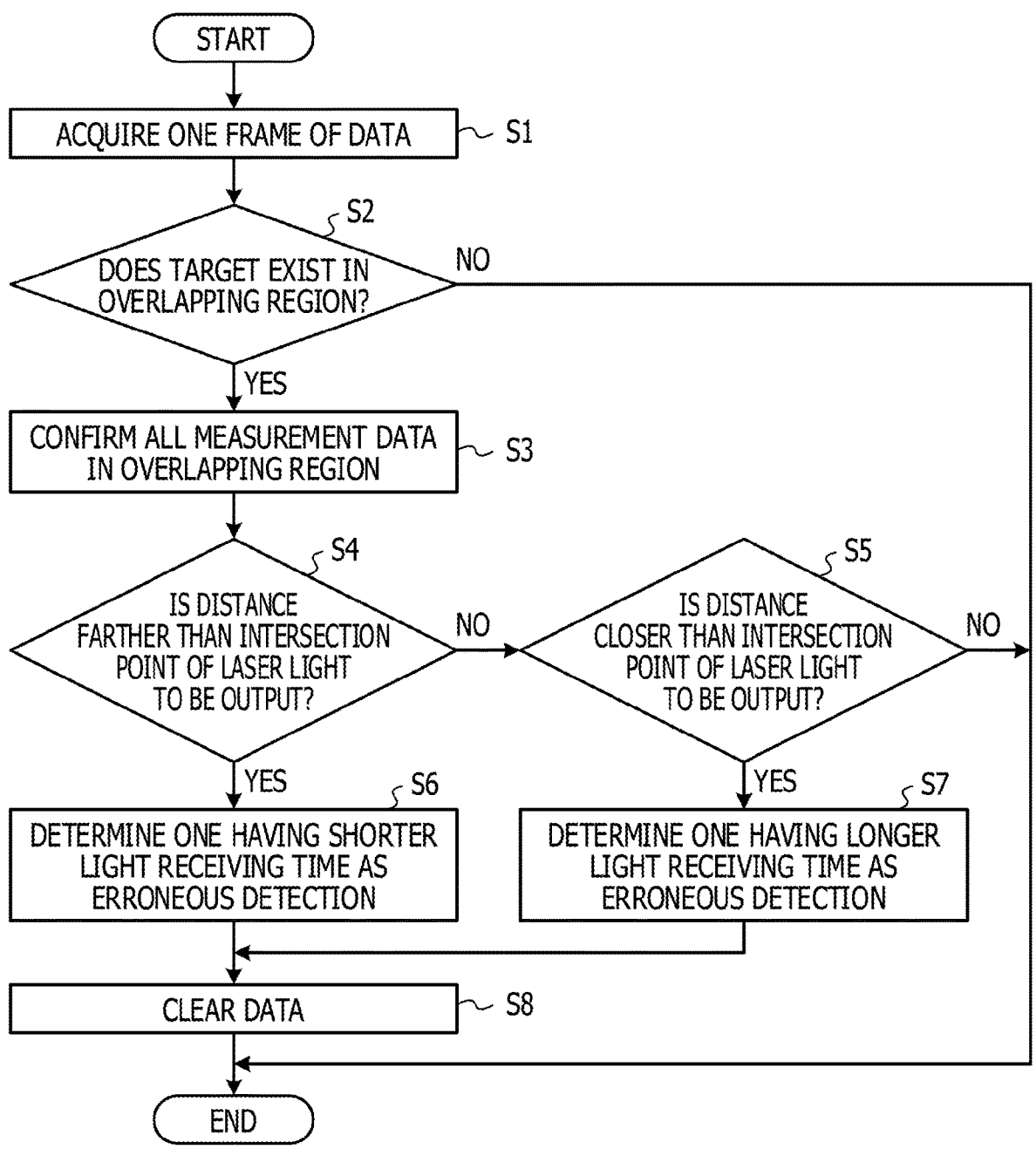
FIG. 9 is a flowchart illustrating an example of an operation of a control device in the first example.

FIG. 9 is a flowchart illustrating an example of an operation of a control device in the first example. The erroneous detection exclusion processing illustrated in FIG. 9 is included in the distance measurement processing and may be executed by the CPU 51, for example.

In step S1 illustrated in FIG. 9, the CPU 51 acquires one frame of data from each of the sensors 1-1 and 1-2. In step S2, for example, FIGS. 4 to 7, the CPU 51 determines whether or not the measurement target 100 exists in the overlapping region 12 where the projection region 11-1 of the sensor 1-1 and the projection region 11-2 of the sensor 1-2 overlap. The projection regions 11-1 and 11-2 of each of the sensors 1-1 and 1-2 are determined in advance, and the overlapping region 12 is determined by the positions of the sensors 1-1 and 1-2 when the sensors 1-1 and 1-2 are installed. Therefore, based on the light projection directions (or the scanning timing of the projection regions 11-1 and 11-2) of each of the sensors 1-1 and 1-2 and the distances from each of the sensors 1-1 and 1-2 to the measurement target 100, the CPU 51 may determine whether or not the measurement target 100 exists within the overlapping region 12. If the determination result in step S2 is YES, the processing proceeds to step S3, and if the determination result in step S2 is NO, the erroneous detection exclusion processing ends. In step S3, the CPU 51 confirms all measurement data in the overlapping region 12.

In step S4, the CPU 51 determines whether or not the distance from the adjacent sensors 1-1 and 1-2 to the measurement target 100 is farther than the distance to the intersection point 13 of the laser light projected by the sensors 1-1 and 1-2, for example, as illustrated in FIGS. 4 and 5. The intersection point 13 of the laser light projected by the sensors 1-1 and 1-2 is determined by the positions of the sensors 1-1 and 1-2 when the sensors 1-1 and 1-2 are installed and the light projection directions (or the scanning timings of the projection regions 11-1 and 11-2) of the sensors 1-1 and 1-2. Therefore, the distance from each of the sensors 1-1 and 1-2 to the intersection point 13 is determined with reference to the positions of the sensors 1-1 and 1-2. If the determination result in step S4 is NO, the processing proceeds to step S5, and if the determination result in step S4 is YES, the processing proceeds to step S6. In step S5, the CPU 51 determines whether or not the distance from the adjacent sensors 1-1 and 1-2 to the measurement target 100 is closer than the distance to the intersection point 13 of the laser light projected by the sensors 1-1 and 1-2, for example, as illustrated in FIGS. 6 and 7. If the determination result in step S5 is YES, the processing proceeds to step S7, and if the determination result in step S5 is NO, the erroneous detection exclusion processing ends.

In step S6, the CPU 51 determines that the detection by the sensor having a shorter light receiving time among the sensors 1-1 and 1-2 is erroneous detection, and the processing proceeds to step S8. On the other hand, in step S7, the CPU 51 determines that the detection by the sensor having a longer light receiving time among the sensors 1-1 and 1-2 is erroneous detection, and the processing proceeds to step S8. In step S8, the CPU 51 clears the data acquired from the sensor determined to have erroneously detected and sets the data out of the measurement target, thereby ending the erroneous detection exclusion processing. Therefore, one frame of data acquired from a sensor not performing erroneous detection may be used for distance measurement processing. In the distance measurement processing, for example, in the order of samples subjected to raster scanning, a distance image in which distance values are arrayed at each distance measurement point may be obtained based on each frame of the data acquired from the sensor not performing erroneous detection.

In this way, if the distance from the adjacent sensors 1-1 and 1-2 to the measurement target 100 is farther than the distance to the intersection point 13 of the laser light output by each of the sensors 1-1 and 1-2, it is determined that the detection by the sensor having a shorter light receiving time is erroneous detection, and if the distance from the adjacent sensors 1-1 and 1-2 to the measurement target 100 is closer than the distance to the intersection point 13, it is determined that the detection by the sensor having a longer light receiving time is erroneous detection and the data acquired from the sensor determined to have erroneously detected is cleared to be excluded from the measurement target. In a case where the distance from the adjacent sensors 1-1 and 1-2 to the measurement target 100 is neither far from nor close to the distance to the intersection point 13 of the laser light output by each of the sensors 1-1 and 1-2, that is, in a case where the measurement target 100 exists on the intersection point 13, since the erroneous detection exclusion processing ends, both data is considered valid and is not cleared.

Figure 10:
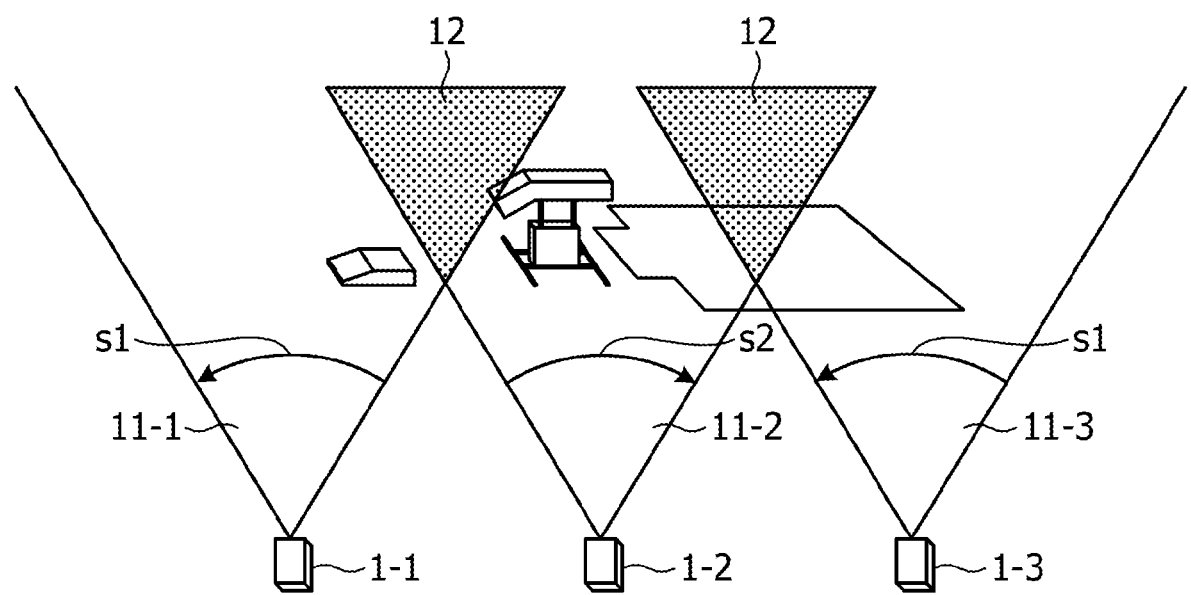
FIG. 10 is a schematic diagram illustrating an example of a scanning direction of the adjacent sensors.

FIG. 10 is a schematic diagram illustrating an example of a scanning direction of the adjacent sensors. In FIG. 10, the adjacent sensors 1-1, 1-2, and 1-3 of the distance measuring apparatus have the same configuration as the sensor 1 illustrated in FIG. 1 and are arranged on a substantially straight line in this example. The sensor 1-1 horizontally scans the laser light in a scanning direction s1 indicated by an arrow and scans a projection region (or scanning range) 11-1. On the other hand, the sensor 1-2 horizontally scans the laser light in a scanning direction s2 indicated by an arrow and scans a projection region (or scanning range) 11-2. Further, the sensor 1-3 horizontally scans the laser light in a scanning direction s1 indicated by an arrow and scans a projection region (or scanning range) 11-3. The scanning direction s1 of the laser light by the sensor 1-1 and the scanning direction s2 of the laser light by the sensor 1-2 are opposite to each other. In addition, the scanning direction s2 of the laser light by the sensor 1-2 and the scanning direction s1 of the laser light by the sensor 1-3 are opposite to each other. In the distance measuring apparatus having a plurality of sensors, in order to remove undetected regions in the appropriate measurement distance range, an overlapping region where the sensors interfere with each other is provided. Therefore, the projection region 11-1 of the sensor 1-1 and the projection region 11-2 of the sensor 1-2 overlap each other in the overlapping region 12. Similarly, the projection region 11-2 of the sensor 1-2 and the projection region 11-3 of the sensor 1-3 overlap each other in the overlapping region 12.

Since the laser light projected by the sensors 1-1, 1-2, and 1-3 two-dimensionally scans the measurement target 100, in FIG. 10, horizontal scanning (or main scanning) is performed in a direction parallel to the paper surface, and vertical scanning (or sub-scanning) is performed in a direction perpendicular to the paper surface. In this way, the laser light projected by each of the sensors 1-1, 1-2, and 1-3 scans the projection region at a regular angle in the horizontal direction and also scans the projection region at a regular angle in the vertical direction.

In this example, since the distance measuring apparatus measures the form or movement of a gymnast player (not illustrated) which is an example of the measurement target 100, a takeoff board, a vaulting horse, a mat, and the like are illustrated in FIG. 10, but the environment using the distance measuring apparatus is not limited to the environment of measuring the form or movement of the gymnast player.

The arrangement of the adjacent sensors 1-1, 1-2, and 1-3 is set such that a desired projection region suitable for measuring the measurement target 100 may be horizontally scanned, and in this example, the adjacent sensors 1-1, 1-2, and 1-3 are separated by a fixed interval. However, the interval between the adjacent sensors 1-1 and 1-2 and the interval between the adjacent sensors 1-2 and 1-3 may not be equal. For convenience of description, the distance from the center of the sensor 1-1 along the perpendicular direction of the first virtual line to the second virtual line which is parallel to the first virtual line passing through the centers of the adjacent sensors 1-1, 1-2, and 1-3 and passing through the center of the measurement target 100, the distance along the perpendicular direction of the first virtual line from the center of the sensor 1-2, and the distance from the center of the sensor 1-3 along the perpendicular direction of the first virtual line are equal, but may be different distances from each other.

Figure 11:
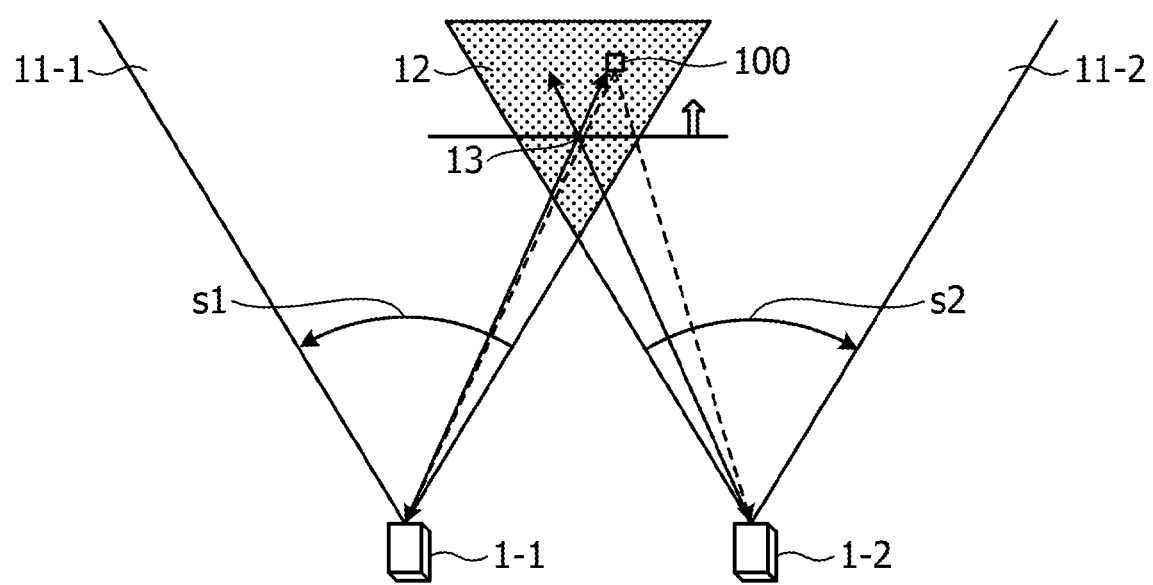
FIG. 11 is a schematic diagram for describing the measurement of an example of the measurement target far from an intersection point of laser light.
Figure 12:
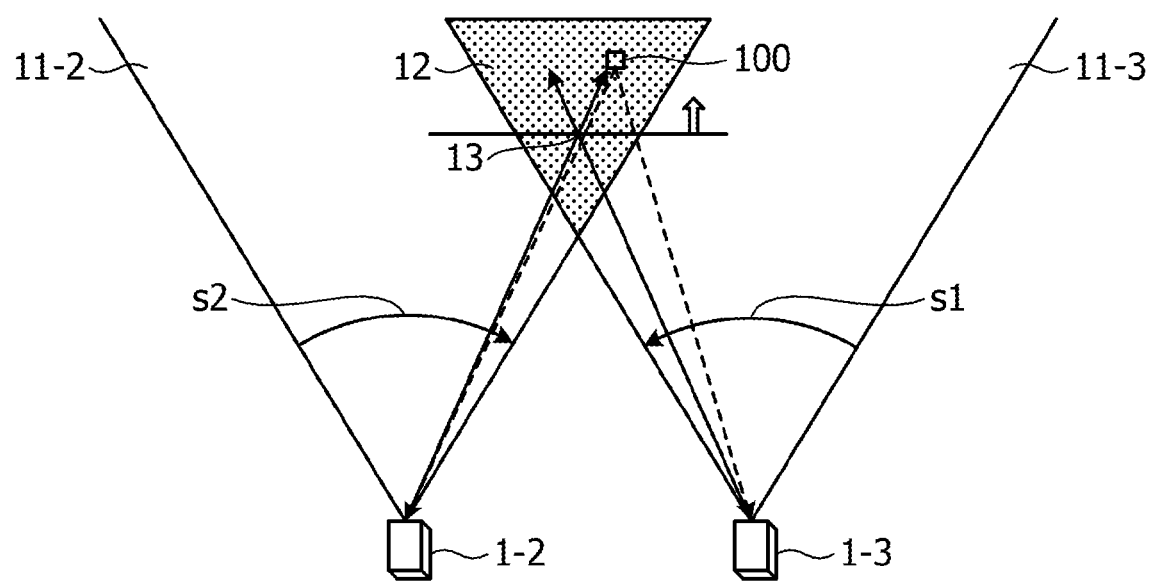
FIG. 12 is a schematic diagram for describing the measurement of another example of the measurement target far from the intersection point of laser light.

FIG. 11 is a schematic diagram for describing the measurement of an example of the measurement target far from the intersection point of the laser light, and FIG. 12 is a schematic diagram for describing the measurement of another example of the measurement target far from the intersection point of the laser light. In FIGS. 11 and 12, the same parts as those in FIG. 10 are denoted by the same reference numerals, and description thereof is omitted. In this example, in FIGS. 11 and 12, by synchronizing the sensors 1-1, 1-2, and 1-3 so that the emitting timing and the scanning timing of the laser light projected by the laser diode 21 are synchronized, the laser light is controlled to be horizontally scanned in the reverse scanning directions s1 and s2 to limit the overlapping region (or erroneously detected region) 12 where the laser light projection regions 11-1, 11-2, and 11-3 overlap to a specific area.

As illustrated in FIG. 11, in the overlapping region 12, in a case where the distance from the sensor 1-1 is farther than the distance to the intersection point 13 of the laser light projected by the sensors 1-1 and 1-2 and the measurement target 100 is located in the overlapping region 12, the laser light indicated by the thick solid line projected by the sensor 1-1 strikes the measurement target 100. The return light of the laser light indicated by the broken line reflected by the measurement target 100 is detected by the respective sensors 1-1 and 1-2. A light receiving time Ta from the time when the sensor 1-1 projects the laser light to the time when the sensor 1-1 detects the return light of the reflected laser light and a light receiving time Tb from the time when the sensor 1-1 projects the laser light to the time when the adjacent sensor 1-2 erroneously detects the return light of the reflected laser light satisfy the relationship of Ta>Tb.

Similarly, as illustrated in FIG. 12, in the overlapping region 12, in a case where the distance from the sensor 1-2 is farther than the distance to the intersection point 13 of the laser light and the measurement target 100 is located in the overlapping region 12, the laser light indicated by the thick solid line projected by the sensor 1-2 strikes the measurement target 100. The return light of the laser light indicated by the broken line reflected by the measurement target 100 is detected by the respective sensors 1-2 and 1-3. The light receiving time Tb from the time when the sensor 1-2 projects the laser light to the time when the sensor 1-2 detects the return light of the reflected laser light and the light receiving time Ta from the time when the sensor 1-2 projects the laser light to the time when the adjacent sensor 1-3 erroneously detects the return light of the reflected laser light satisfy the relationship of Tb>Tc.

As described above, in the case of the measurement target 100 which is farther from the intersection point 13 of the laser light projected by the sensors 1-1, 1-2, and 1-3, the sensor having a shorter light receiving time performs erroneous detection between the two adjacent sensors.

Figure 13:
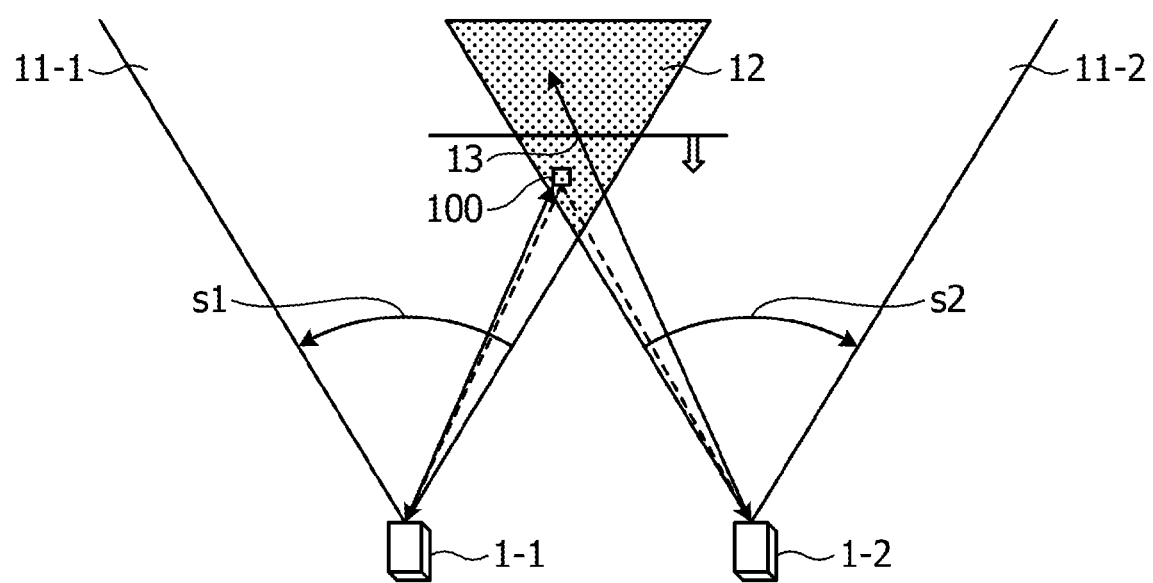
FIG. 13 is a schematic diagram for describing the measurement of an example of a measurement target closer than the intersection point of laser light.
Figure 14:
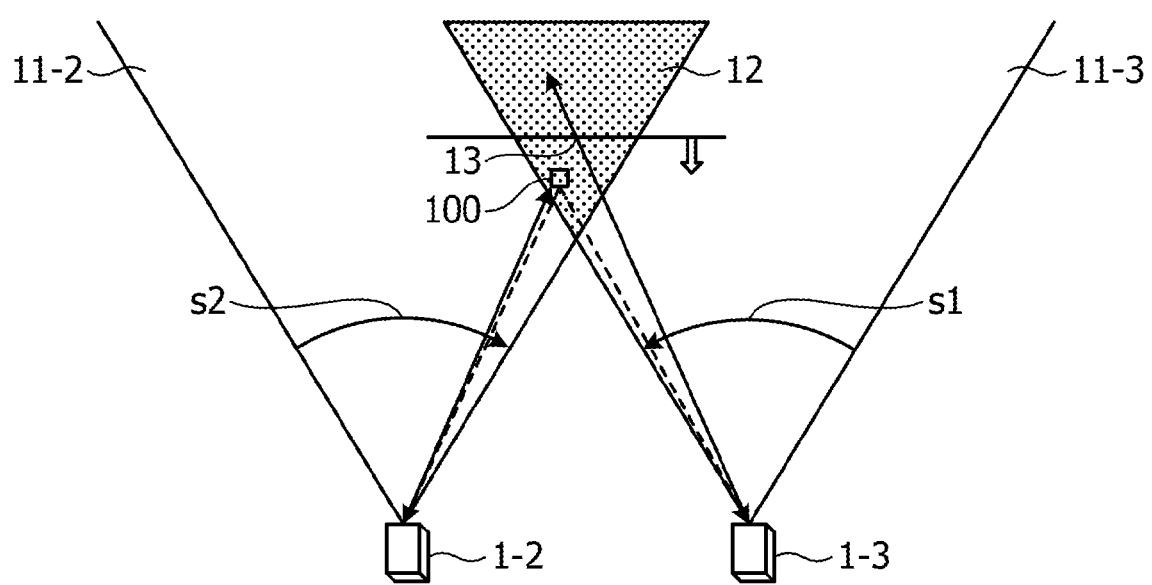
FIG. 14 is a schematic diagram for describing the measurement of another example of the measurement target closer than the intersection point of laser light.

FIG. 13 is a schematic diagram for describing the measurement of an example of the measurement target closer than the intersection point of the laser light, and FIG. 14 is a schematic diagram for describing the measurement of another example of the measurement target closer than the intersection point of the laser light. In FIGS. 13 and 14, the same parts as those in FIG. 10 are denoted by the same reference numerals, and description thereof is omitted.

As illustrated in FIG. 13, in the overlapping region 12, in a case where the distance from the sensor 1-1 is closer than the distance to the intersection point 13 of the laser light projected by the sensors 1-1 and 1-2 and the measurement target 100 is located in the overlapping region 12, the laser light indicated by the thick solid line projected by the sensor 1-1 strikes the measurement target 100. The return light of the laser light indicated by the broken line reflected by the measurement target 100 is detected by the respective sensors 1-1 and 1-2. The light receiving time Ta from the time when the sensor 1-1 projects the laser light to the time when the sensor 1-1 detects the return light of the reflected laser light and the light receiving time Tb from the time when the sensor 1-1 projects the laser light to the time when the adjacent sensor 1-2 erroneously detects the return light of the reflected laser light satisfy the relationship of Ta<Tb.

Similarly, as illustrated in FIG. 14, in the overlapping region 12, in a case where the distance from the sensor 1-2 is closer than the distance to the intersection point 13 of the laser light and the measurement target 100 is located in the overlapping region 12, the laser light indicated by the thick solid line projected by the sensor 1-2 strikes the measurement target 100. The return light of the laser light indicated by the broken line reflected by the measurement target 100 is detected by the respective sensors 1-2 and 1-3. The light receiving time Tb from the time when the sensor 1-2 projects the laser light to the time when the sensor 1-2 detects the return light of the reflected laser light and the light receiving time Ta from the time when the sensor 1-2 projects the laser light to the time when the adjacent sensor 1-3 erroneously detects the return light of the reflected laser light satisfy the relationship of Tb<Tc.

As described above, in the case of the measurement target 100 which is closer than the intersection point 13 of the laser light projected by the sensors 1-1, 1-2, and 1-3, the sensor having a longer light receiving time performs erroneous detection between the two adjacent sensors.

Therefore, the positions of the adjacent sensors 1-1, 1-2, and 1-3, the intersection point 13 of the laser light to be projected, and the light receiving time until each of the sensors 1-1, 1-2, and 1-3 receives return light from the measurement target 100, it is possible to determine whether or not one of the sensors performs erroneous detection of the laser light projected by the other sensor for each pair of the adjacent sensors 1-1 and 1-2 and the adjacent pair of sensors 1-2 and 1-3.

Figure 15A:
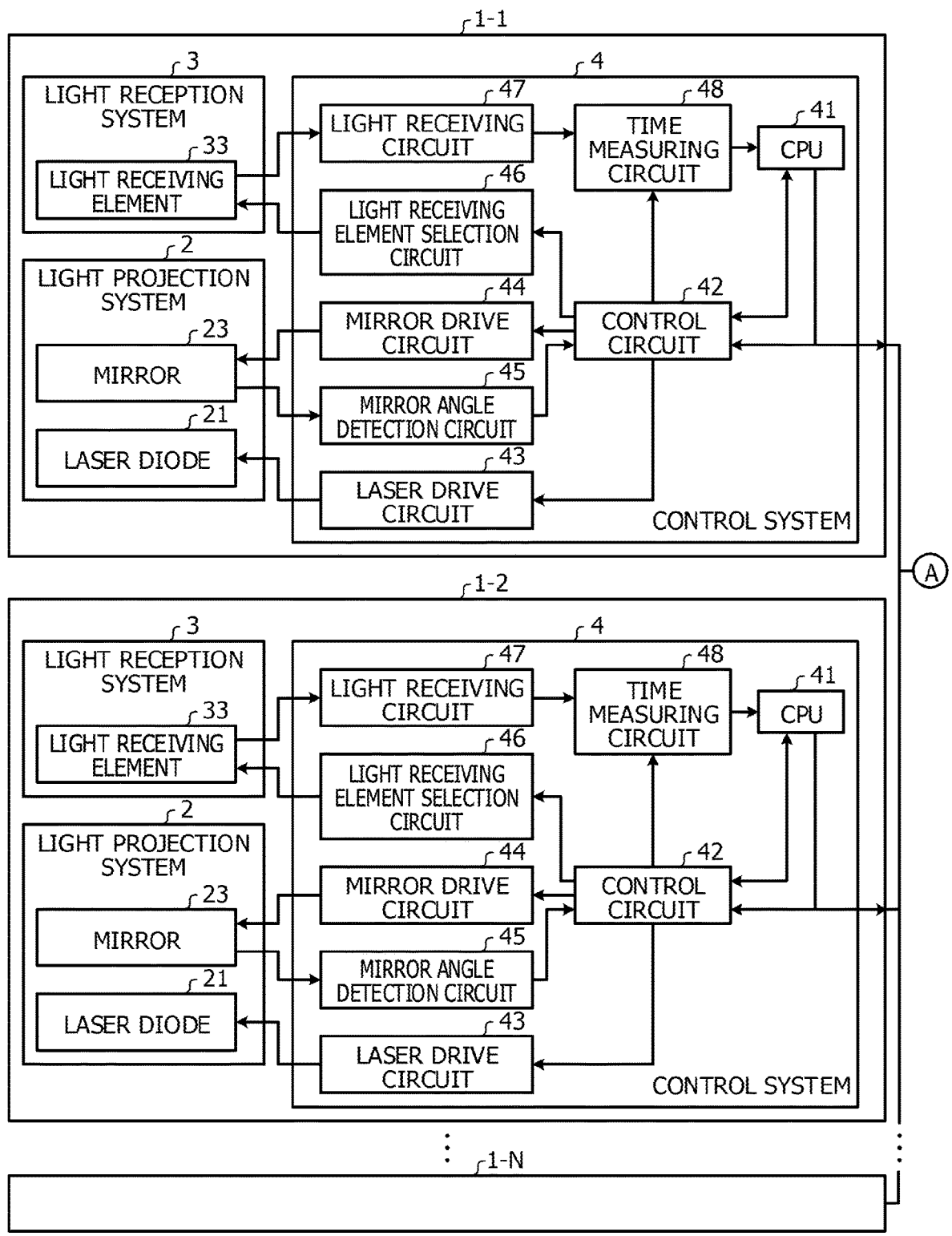
FIGS. 15A and 15B are a block diagram illustrating an example of a configuration of a distance measuring apparatus in a second example.
Figure 15B:
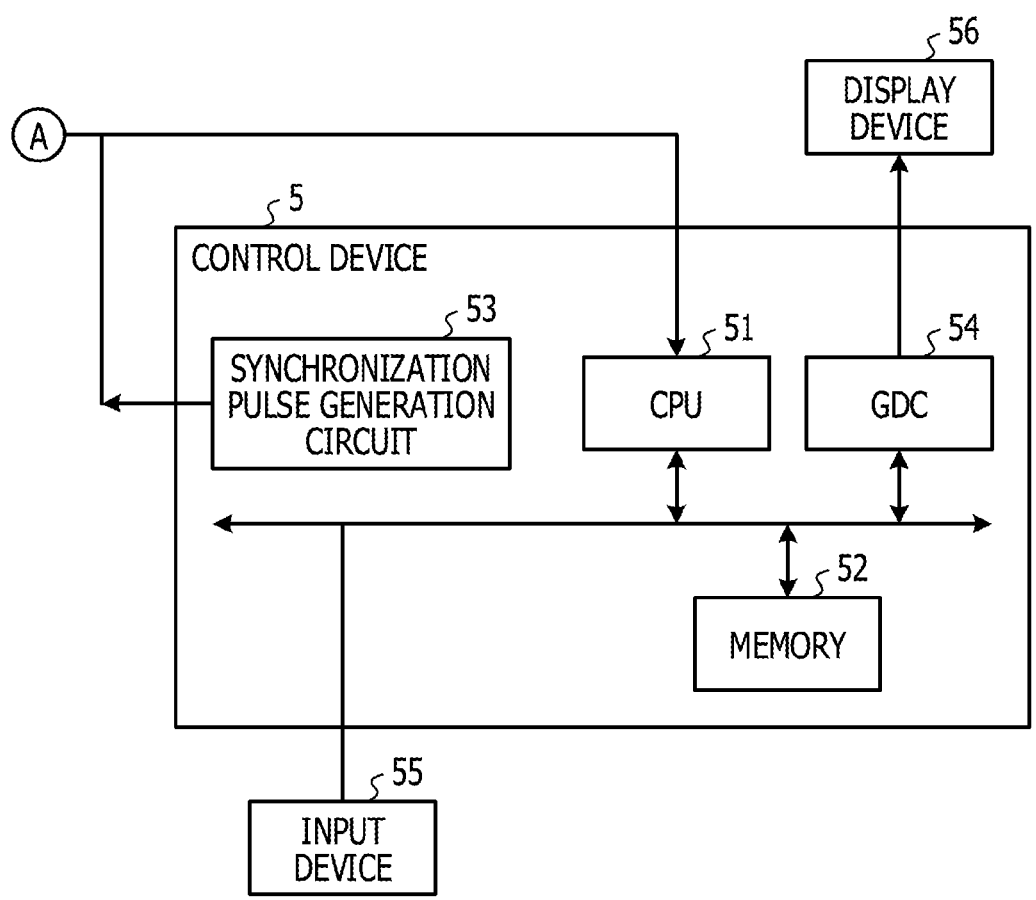

FIG. 15 (i.e. FIGS. 15A and 15B) is a block diagram illustrating an example of a configuration of a distance measuring apparatus in a second example. In FIG. 15, the same parts as those in FIG. 8 are denoted by the same reference numerals, and description thereof is omitted. A distance measuring apparatus 40-2 illustrated in FIG. 15 includes sensors 1-1 to 1-N(N is a natural number of 3 or more) and the control device 5. Each of the sensors 1-1 to 1-N has the same configuration including the light projection system 2, the light reception system 3, and the control system 4. In the example described in conjunction with FIGS. 10 to 14, N=3, but N is not limited to N=3, and N may be an odd number or an even number. The control device 5 is an example of a control unit that controls the sensors 1-1 to 1-N. Specifically, the control device 5 is an example of a control unit that performs control so that the emitting timing and the scanning timing of the laser light projected by each pair of the light projection systems 2 of the adjacent sensors among the sensors 1-1 to 1-N are synchronized and the laser light is horizontally scanned in the reverse direction and excludes the laser light projected by the other sensor in one sensor of each pair of adjacent sensors from the measurement target based on the relationship between the position of the light receiving portion where the multi-division light receiving element 33 of each light reception system 3 of each pair of adjacent sensors receives the return light and the position of the light receiving portion of the multi-division light receiving element 33 corresponding to the projection direction of the laser light projected by each light projection system 2. In a case where the measurement target 100 is located in the overlapping region 12 where the projection regions of the laser light of each pair of adjacent sensors overlap, the control device 5 excludes the laser light projected by the other sensor in one sensor from the measurement target based on the positions of each pair of adjacent sensors, the intersection point 13 of the laser light projected by each light projection system 2, and the light receiving time measured by each light reception system 3 from the time when each light projection system 2 projects the laser light to the time when the return light from the measurement target 100 is received.

The control device 5 is also an example of a control unit that controls the laser light to be horizontally scanned in the scanning directions s1 and s2 that are opposite to each other as illustrated in FIGS. 10 to 14, for example and limits the overlapping region 12 where the laser light projection regions overlap to a specific area by synchronizing the sensors 1-1 and 1-N so that the emitting timing and the scanning timing of the laser light projected by the laser diode 21 are synchronized between the adjacent sensors.

Figure 16:
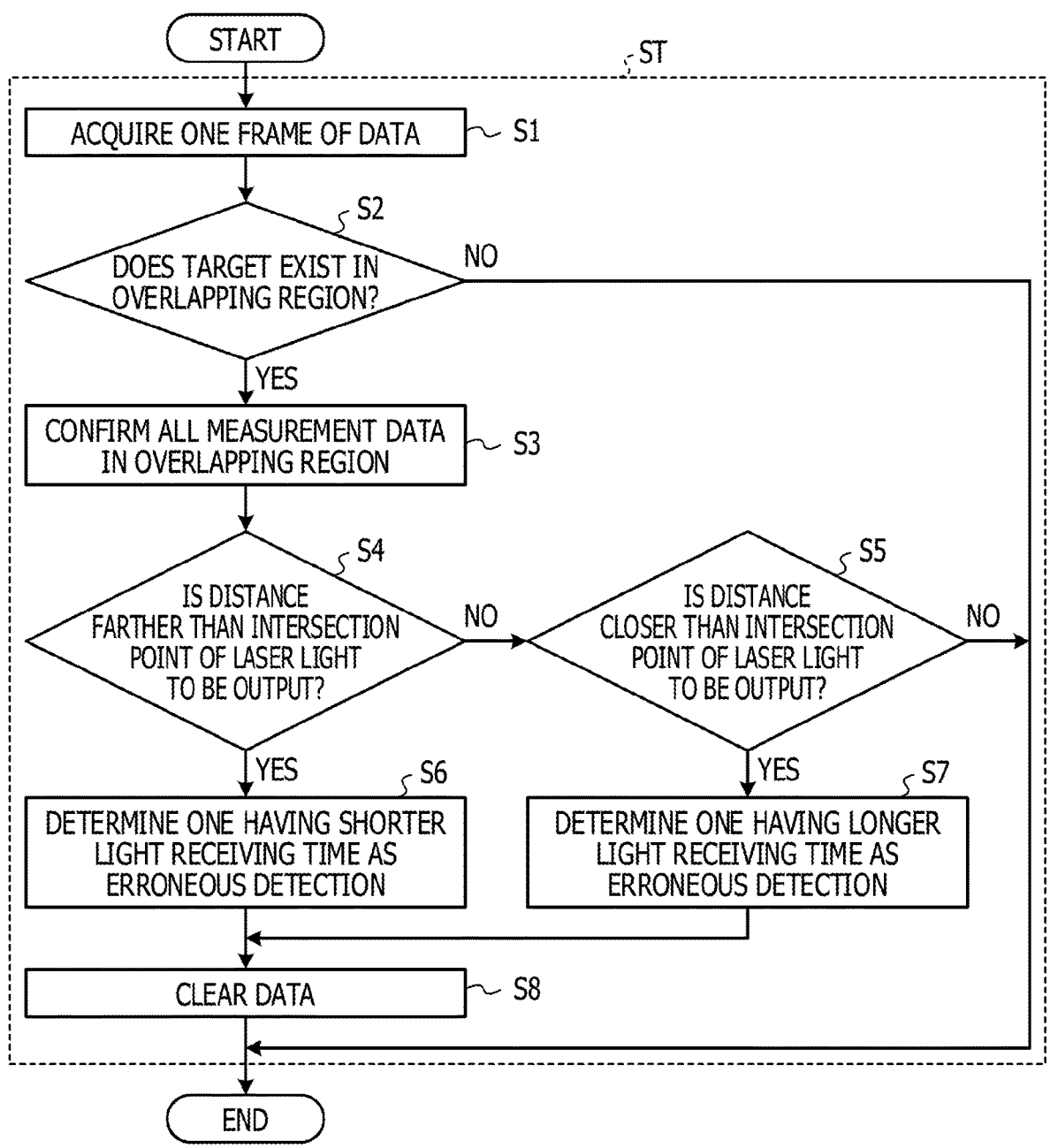
FIG. 16 is a flowchart illustrating an example of an operation of a control device in the second example.

FIG. 16 is a flowchart illustrating an example of an operation of a control device in a second example. The erroneous detection exclusion processing illustrated in FIG. 16 is included in the distance measurement processing and may be executed by the CPU 51, for example. In FIG. 16, the same steps as those in FIG. 9 are denoted by the same reference numerals, and description thereof is omitted. In this example, the CPU 51 executes the processing of steps S1 to S8 surrounded by a broken line ST on the pair of the adjacent sensors 1-$i$ and 1-$i$+1 ($i$=1 to N−1) and the pair of adjacent sensors 1-$i$+1 and 1-$i$+2, respectively.

For example, if N=3, the distance to the measurement target 100 for each pair of the adjacent sensors 1-1 and 1-2 and the adjacent sensors 1-2 and 1-3 is farther than the distance to the intersection point 13 of the laser light output by the pair of sensors 1-1 and 1-2 and the pair of sensors 1-2 and 1-3, it is determined that the detection by the sensor having a shorter light receiving time in each pair is erroneous detection, and if the distance to the measurement target 100 for each pair of the adjacent sensors 1-1 and 1-2 and the adjacent sensors 1-2 and 1-3 is closer than the intersection point, it is determined that the detection by the sensor having a longer light receiving time in each pair is erroneous detection and the data acquired from the sensor determined to have erroneously detected is cleared to be excluded from the measurement target. In a case where the distance from each pair of the adjacent sensors 1-1 and 1-2 and the adjacent sensors 1-2 and 1-3 to the measurement target 100 is neither far from nor close to the distance to the intersection point 13 of the laser light output by each of the sensors 1-2 and 1-3, that is, in a case where the measurement target 100 exists on the intersection point 13, since the erroneous detection exclusion processing ends, both data is considered valid and is not cleared.

Figure 17:
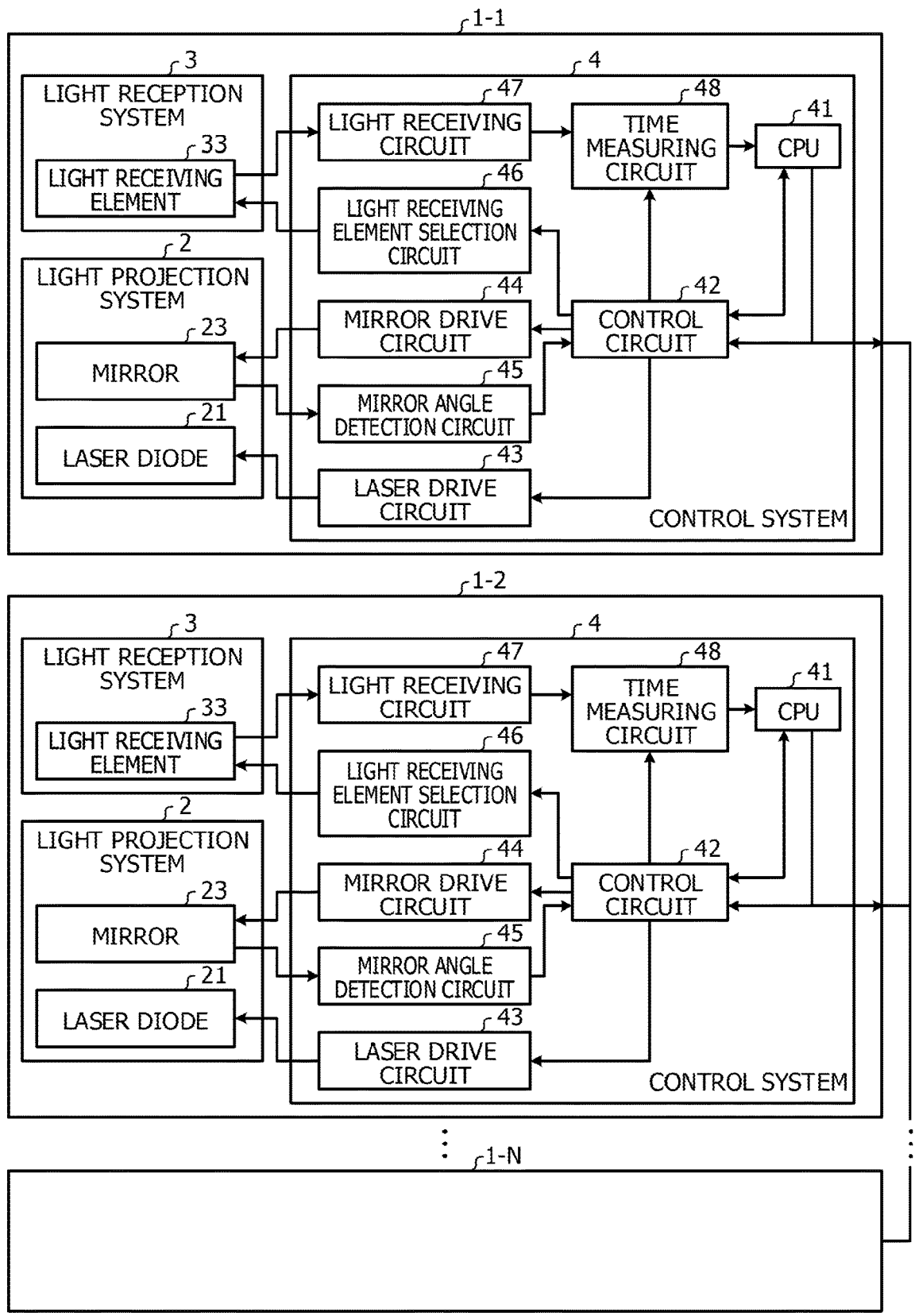
FIG. 17 is a block diagram illustrating an example of a configuration of a distance measuring apparatus in a third example.

FIG. 17 is a block diagram illustrating an example of a configuration of a distance measuring apparatus in a third example. In FIG. 17, the same parts as those in FIG. 15 are denoted by the same reference numerals, and description thereof is omitted. A distance measuring apparatus 40-3 illustrated in FIG. 17 includes sensors 1-1 to 1-N(N is a natural number of 3 or more). Each of the sensors 1-1 to 1-N has the same configuration including the light projection system 2, the light reception system 3, and the control system 4. In the example described in conjunction with FIGS. 10 to 14, N=3. In addition, among the sensors 1-1 to 1-N, one sensor (for example, sensor 1-1) functions as a master for executing the operation of the control device 5 of the second example, and the remaining sensors (for example, sensor 1-2 to 1-N) function as a slave for executing the operation of each sensor of the second example. The CPU 41 of the control system 4 of the master sensor 1-1 may have a higher function (or higher performance) than the CPU 41 of the control system 4 of the slave sensors 1-2 to 1-N.

The operation of the control system 4 of the master sensor 1-1 in the third example may be similar to the operation of the control device 5 in the second example. Specifically, the operation of the CPU 41 of the control system 4 of the master sensor 1-1 may be the same as the operation of the CPU 51 of the control device 5 in the second example. In addition, the CPU 41 or the control circuit 42 of the control system 4 of the master sensor 1-1 may execute the operation of the synchronization pulse generation circuit 53 of the control device 5 in the second example. The control system 4 of the master sensor 1-1 is an example of a control unit for controlling the sensors 1-1 to 1-N. Specifically, the control system 4 of the master sensor 1-1 is an example of a control unit that performs control so that the emitting timing and the scanning timing of the laser light projected by each pair of the light projection systems 2 of the adjacent sensors among the sensors 1-1 to 1-N are synchronized and the laser light is horizontally scanned in the reverse direction and excludes the laser light projected by the other sensor in one sensor of each pair of adjacent sensors from the measurement target based on the relationship between the position of the light receiving portion where the multi-division light receiving element 33 of each light reception system 3 of each pair of adjacent sensors receives the return light and the position of the light receiving portion of the multi-division light receiving element 33 corresponding to the projection direction of the laser light projected by each light projection system 2. In a case where the measurement target 100 is located in the overlapping region 12 where the projection regions of the laser light of each pair of adjacent sensors overlap, the control device 5 excludes the laser light projected by the other sensor in one sensor from the measurement target based on the positions of each pair of adjacent sensors, the intersection point 13 of the laser light projected by each light projection system 2, and the light receiving time measured by each light reception system 3 from the time when each light projection system 2 projects the laser light to the time when the return light from the measurement target 100 is received.

The control system 4 of the master sensor 1-1 is also an example of a control unit that controls the laser light to be horizontally scanned in the scanning directions s1 and s2 that are opposite to each other as illustrated in FIGS. 10 to 14, for example and limits the overlapping region 12 where the laser light projection regions overlap to a specific area by synchronizing the sensors 1-1 and 1-N so that the emitting timing and the scanning timing of the laser light projected by the laser diode 21 are synchronized between the adjacent sensors.

According to the present example, it is possible to omit the control device 5 that is separate from the sensors 1-1 to 1-N.

According to each of the above-described examples, even in a case where the projection regions of a plurality of two-dimensional scanning laser sensors that simultaneously perform measurement interfere with each other, in a case where the measurement target is located in the overlapping region where the projection regions of the laser light of the adjacent two-dimensional scanning laser sensors overlap, based on the positions of the adjacent two-dimensional scanning laser sensors, the intersection point of the laser light projected by each light projection system, and the light receiving time measured by each light reception system from the time when each light projection system projects the laser light to the time when the return light from the measurement target is received, the laser light projected by the other sensor in the one sensor of the adjacent two-dimensional scanning laser sensors is excluded from the measurement target, thereby suppressing erroneous detection. For example, in the case of measuring the form or movement of a gymnast player by the distance measuring apparatus, it is also possible to score gymnastics performance based on the analyzed form or movement.

In order to accurately measure the movement of a gymnast player in the case of scoring gymnastics performance and the like, it is desirable to measure the movement of the gymnast player at a high angle of view, high resolution, and high frame rate, but according to each of the above-described examples, it is possible to simultaneously realize measurement at a high angle of view, measurement at a high resolution, and measurement at a high frame rate, which are in a trade-off relationship.

In each of the above examples, a plurality of two-dimensional scanning laser sensors adjacent to each other may be arranged on a straight line or may be arranged on one curved line. In addition, the plurality of adjacent two-dimensional scanning laser sensors may be arranged on a plurality of mutually parallel virtual lines. That is, the plurality of adjacent two-dimensional scanning laser sensors may be arranged on one or a plurality of mutually parallel virtual lines, and the virtual lines may be a straight line or a curved line. That is, the arrangement of the plurality of two-dimensional scanning laser sensors adjacent to each other is not particularly limited as long as the desired projection region may be horizontally scanned.

In addition, in each of the above-described examples, the distance measuring apparatus 40-1, 40-2, and 40-3 may form an object detection system that detects the measurement target 100 by obtaining a distance image, for example.

The distance measuring apparatus, the distance measuring method, and the program disclosed are described above by way of examples, but the present disclosure is not limited to the above-mentioned examples, and it goes without saying that various modifications and improvements are possible within the scope of the present disclosure.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A distance measuring apparatus comprising:
    a plurality of two-dimensional scanning laser sensors; and
    a control circuit configured to control the plurality of two-dimensional scanning laser sensors, wherein
    each of the two-dimensional scanning laser sensors includes
        a light projection system configured to project a laser beam for scanning a measurement target, and
        a light reception system configured to output a signal corresponding to an estimated distance to the measurement target by using a multi-division light receiving element configured to receive return light of the laser beam reflected by the measurement target, and
    the control circuit is configured to:
        synchronize a scanning timing of the laser beam projected by a light projection system of each of adjacent two-dimensional scanning laser sensors among the plurality of two-dimensional scanning laser sensors, and cause the adjacent two-dimensional scanning laser sensors to horizontally scan the laser beam in a direction opposite from each other, the adjacent two-dimensional scanning laser sensors including a first sensor and a second sensor, each of the first sensor and the second sensor being any one of the plurality of two-dimensional scanning laser sensors and being placed adjacent to each other in the plurality of two-dimensional scanning laser sensors; and
        exclude, from measuring of the estimated distance to the measurement target in the first sensor of the adjacent two-dimensional scanning laser sensors, the laser beam projected by the second sensor of the adjacent two-dimensional scanning laser sensors, by using the positions of the adjacent two-dimensional scanning laser sensors, an estimated intersection point of two laser beams projected from the adjacent two-dimensional scanning laser sensors at a time when the measurement target is located in a projection direction of the laser beam projected from any of the first sensor or the second sensor included in the adjacent two-dimensional scanning laser sensors, and a light receiving time measured by each light reception system from the time when each light projection system projects the laser beam to the time when the return light from the measurement target is received, in a case where the measurement target is located in an overlapping region where a projection region of the laser beam of the first sensor overlaps at least in part with a projection region of the laser beam of the second sensor, overlap,
    wherein the excluding of the laser beam is configured to:
    in a case where an estimated distance from the first sensor to the measurement target is farther than an estimated distance from the first sensor to the estimated intersection point in the overlapping region, exclude the laser beam detected by the second sensor in response that the light receiving time measured by the second sensor is less than the receiving time measured by the first sensor; and
    in a case where an estimated distance from the first sensor to the measurement target is closer than an estimated distance from the first sensor to the intersection point, exclude the laser beam detected by the second sensor in response that the light receiving time measured by the second sensor is larger than the receiving time measured by the first sensor.

2. The distance measuring apparatus according to claim 1, wherein
    the control circuit is configured to limit the overlapping region to a specific area by matching a timing of scanning the laser beam projected by each light projection system of the plurality of two-dimensional scanning laser sensors and causing the adjacent two-dimensional scanning laser sensors to each horizontally scan the laser beam in a reverse direction.

3. The distance measuring apparatus according to claim 1, wherein
    the plurality of two-dimensional scanning laser sensors are arranged on one or a plurality of mutually parallel virtual lines, and the virtual line is a straight line or a curved line.

4. The distance measuring apparatus according to claim 1, wherein
    the adjacent two-dimensional scanning laser sensors is a pair of the first sensor and the second sensor.

5. The distance measuring apparatus according to claim 1, wherein
    the adjacent two-dimensional scanning laser sensors include, in addition to the first and second sensors, a third sensor being any one of the plurality of two-dimensional scanning laser sensors and being placed adjacent to at least any one of the first and second sensors, in a case where the measurement target is located in a first overlapping region where the projection region of the laser beam of the first sensor overlaps at least in part with the projection region of the laser beam of the second sensor, the control circuit is configured to exclude, in one of the first and second sensors, the laser beam projected by another sensor of the first and second sensors from measuring of the estimated distance to the measurement target, and in a case where the measurement target is located in a second overlapping region where the projection region of the laser beam of the second sensor overlaps at least in part with the projection region of the laser beam of the third sensor, the control circuit is configured to exclude, in one of the second and third sensors, the laser beam projected by another sensor of the second and third sensors from measuring of the estimated distance to the measurement target.

6. The distance measuring apparatus according to claim 1, wherein
the control circuit is separated from the plurality of two-dimensional scanning laser sensors.

7. The distance measuring apparatus according to claim 1, wherein
the control circuit is included in any one of the two-dimensional scanning laser sensors.

8. A distance measuring method performed by a processor, the method comprising:
providing a pulse signal to a plurality of two-dimensional scanning laser sensors each of which includes a light projection system and a light reception system, the light projection system being configured to project laser beam for scanning a measurement target, the light reception system being configured to output a signal corresponding to an estimated distance to the measurement target by using a multi-division light receiving element configured to receive return light of the laser beam reflected by the measurement target;

synchronizing a scanning timing of the laser beam projected by a light projection system of each of adjacent two-dimensional scanning laser sensors among the plurality of two-dimensional scanning laser sensors, and cause the adjacent two-dimensional scanning laser sensors to horizontally scan the laser beam in a direction opposite from each other, the adjacent two-dimensional scanning laser sensors including a first sensor and a second sensor, each of the first sensor and the second sensor being any one of the plurality of two-dimensional scanning laser sensors and being placed adjacent to each other in the plurality of two-dimensional scanning laser sensors; and excluding, from measuring of the estimated distance to the measurement target in the first sensor of the adjacent two-dimensional scanning laser sensors, the laser beam projected by the second sensor of the adjacent two-dimensional scanning laser sensors, by using the positions of the adjacent two-dimensional scanning laser sensors, an estimated intersection point of two laser beams projected from the adjacent two-dimensional scanning laser sensors at a time when the measurement target is located in a projection direction of the laser beam projected from any of the first sensor or the second sensor included in the adjacent two-dimensional scanning laser sensors, and a light receiving time measured by each light reception system from the time when each light projection system projects the laser beam to the time when the return light from the measurement target is received, in a case where the measurement target is located in an overlapping region where a projection region of the laser beam of the first sensor overlaps at least in part with a projection region of the laser beam of the second sensor, wherein the excluding of the laser beam is configured to:
in a case where an estimated distance from the first sensor to the measurement target is farther than an estimated distance from the first sensor to the estimated intersection point in the overlapping region, exclude the laser beam detected by the second sensor in response that the light receiving time measured by the second sensor is less than the receiving time measured by the first sensor; and in a case where an estimated distance from the first sensor to the measurement target is closer than an estimated distance from the first sensor to the intersection point, exclude the laser beam detected by the second sensor in response that the light receiving time measured by the second sensor is larger than the receiving time measured by the first sensor.

9. The distance measuring method according to claim 7, the method further comprising:
limiting the overlapping region to a specific area by matching a timing of scanning the laser beam projected by each light projection system of the plurality of two-dimensional scanning laser sensors and causing the adjacent two-dimensional scanning laser sensors to each horizontally scan the laser beam in a reverse direction.

10. The distance measuring method according to claim 8, the method further comprising:
the plurality of two-dimensional scanning laser sensors are arranged on one or a plurality of mutually parallel virtual lines, and the virtual line is a straight line or a curved line.

11. The distance measuring method according to claim 8, wherein
the adjacent two-dimensional scanning laser sensors is a pair of the first sensor and the second sensor.

12. The distance measuring method according to claim 8, wherein
the adjacent two-dimensional scanning laser sensors include, in addition to the first and second sensors, a third sensor being any one of the plurality of two-dimensional scanning laser sensors and being placed adjacent to at least any one of the first and second sensors, the method further comprises:
in a case where the measurement target is located in a first overlapping region where the projection region of the laser beam of the first sensor overlaps at least in part with the projection region of the laser beam of the second sensor,
excluding, in one of the first and second sensors, the laser beam projected by another sensor of the first and second sensors from measuring of the estimated distance to the measurement target; and in a case where the measurement target is located in a second overlapping region where the projection region of the laser beam of the second sensor overlaps at least in part with the projection region of the laser beam of the third sensor, excluding, in one of the second and third sensors, the laser beam projected by another sensor of the second and third sensors from measuring of the estimated distance to the measurement target.

13. A non-transitory computer-readable storage medium for storing a distance measuring program which causes a processor to execute a process, the process comprising:

providing a pulse signal to a plurality of two-dimensional scanning laser sensors each of which includes a light projection system and a light reception system, the light projection system being configured to project laser beam for scanning a measurement target, the light reception system being configured to output a signal corresponding to an estimated distance to the measurement target by using a multi-division light receiving element configured to receive return light of the laser beam reflected by the measurement target;

synchronizing a scanning timing of the laser beam projected by a light projection system of each of adjacent two-dimensional scanning laser sensors among the plurality of two-dimensional scanning laser sensors, and cause the adjacent two-dimensional scanning laser sensors to horizontally scan the laser beam in a direction opposite from each other, the adjacent two-dimensional scanning laser sensors including a first sensor and a second sensor, each of the first sensor and the second sensor being any one of the plurality of two-dimensional scanning laser sensors and being placed adjacent to each other in the plurality of two-dimensional scanning laser sensors; and excluding, from measuring of the estimated distance to the measurement target in the first sensor of the adjacent two-dimensional scanning laser sensors, the laser beam projected by the second sensor of the adjacent two-dimensional scanning laser sensors, by using the positions of the adjacent two-dimensional scanning laser sensors, an estimated intersection point of two laser beams projected from the adjacent two-dimensional scanning laser sensors at a time when the measurement target is located in a projection direction of the laser beam projected from any of the first sensor or the second sensor included in the adjacent two-dimensional scanning laser sensors, and a light receiving time measured by each light reception system from the time when each light projection system projects the laser beam to the time when the return light from the measurement target is received, in a case where the measurement target is located in an overlapping region where a projection region of the laser beam of the first sensor overlaps at least in part with a projection region of the laser beam of the second sensor, wherein the excluding of the laser beam is configured to:

in a case where an estimated distance from the first sensor to the measurement target is farther than an estimated distance from the first sensor to the estimated intersection point in the overlapping region, exclude the laser beam detected by the second sensor in response that the light receiving time measured by the second sensor is less than the receiving time measured by the first sensor; and in a case where an estimated distance from the first sensor to the measurement target is closer than an estimated distance from the first sensor to the intersection point, exclude the laser beam detected by the second sensor in response that the light receiving time measured by the second sensor is larger than the receiving time measured by the first sensor.

14. The non-transitory computer-readable storage medium according to claim 13, wherein the process further includes:

limiting the overlapping region to a specific area by matching a timing of scanning the laser beam projected by each light projection system of the plurality of two-dimensional scanning laser sensors and causing the adjacent two-dimensional scanning laser sensors to each horizontally scan the laser beam in a reverse direction.

15. The non-transitory computer-readable storage medium according to claim 13, wherein the process further includes:

the plurality of two-dimensional scanning laser sensors are arranged on one or a plurality of mutually parallel virtual lines, and the virtual line is a straight line or a curved line.

16. The non-transitory computer-readable storage medium according to claim 13, wherein the adjacent two-dimensional scanning laser sensors is a pair of the first sensor and the second sensor.

17. The non-transitory computer-readable storage medium according to claim 13, wherein the adjacent two-dimensional scanning laser sensors include, in addition to the first and second sensors, a third sensor being any one of the plurality of two-dimensional scanning laser sensors and being placed adjacent to at least any one of the first and second sensors, the process is further includes:

in a case where the measurement target is located in a first overlapping region where the projection region of the laser beam of the first sensor overlaps at least in part with the projection region of the laser beam of the second sensor, excluding, in one of the first and second sensors, the laser beam projected by another sensor of the first and second sensors from measuring of the estimated distance to the measurement target; and in a case where the measurement target is located in a second overlapping region where the projection region of the laser beam of the second sensor overlaps at least in part with the projection region of the laser beam of the third sensor, excluding, in one of the second and third sensors, the laser beam projected by another sensor of the second and third sensors from measuring of the estimated distance to the measurement target.

* * * * *